United States Patent
Miao et al.

(10) Patent No.: US 10,362,525 B2
(45) Date of Patent: Jul. 23, 2019

(54) APPARATUS, SYSTEM AND METHOD OF RELAY BACKHAULING WITH MILLIMETER WAVE CARRIER AGGREGATION

(71) Applicant: INTEL IP CORPORATION, Santa Clara, CA (US)

(72) Inventors: Honglei Miao, Munich (DE); Michael Faerber, Wolfratshausen (DE); Bernhard Raaf, Neuried (DE)

(73) Assignee: INTEL IP CORPORATION, Santa Clara, CA (US)

(*) Notice: Subject to any disclaimer, the term of this patent is extended or adjusted under 35 U.S.C. 154(b) by 138 days.

(21) Appl. No.: 15/503,477

(22) PCT Filed: Sep. 11, 2015

(86) PCT No.: PCT/US2015/049532
§ 371 (c)(1),
(2) Date: Feb. 13, 2017

(87) PCT Pub. No.: WO2016/044069
PCT Pub. Date: Mar. 24, 2016

(65) Prior Publication Data
US 2017/0230893 A1    Aug. 10, 2017

Related U.S. Application Data

(60) Provisional application No. 62/050,578, filed on Sep. 15, 2014.

(51) Int. Cl.
*H04B 7/155* (2006.01)
*H04W 36/08* (2009.01)
(Continued)

(52) U.S. Cl.
CPC ........ *H04W 40/22* (2013.01); *H04B 7/15542* (2013.01); *H04W 36/08* (2013.01); *H04W 72/042* (2013.01); *H04W 84/042* (2013.01)

(58) Field of Classification Search
None
See application file for complete search history.

(56) References Cited

U.S. PATENT DOCUMENTS 8,400,967 B2 * 3/2013 Wu .................. H04W 76/11
370/328
8,467,351 B2 * 6/2013 Liu .................. H04W 36/0094
370/332

(Continued)

FOREIGN PATENT DOCUMENTS

CN     102006641     4/2011
CN     102111884     6/2011

(Continued)

OTHER PUBLICATIONS

Office Action for Japanese Patent Application No. 2017-506910, dated Apr. 17, 2018, 5 pages (Including 3 pages of English translation).

(Continued)

*Primary Examiner* — Gregory B Sefcheck
(74) *Attorney, Agent, or Firm* — Shichrur & Co.

(57) ABSTRACT

Some demonstrative embodiments include devices, systems and methods of relay backhauling with millimeter wave carrier aggregation. For example, a first Relay Node (RN) may include a cellular transceiver configured to communicate with a Donor evolved Node B (DeNB) over a cellular frequency band of a Primary cell (PCell); a millimeter-wave (mmWave) transceiver to communicate with a second RN via a backhaul link over a mmWave frequency band of a Secondary cell (SCell) within the PCell; and a controller to process a Relay-Physical-Downlink-Control-Channel (Continued)

(R-PDCCH) message received by the cellular transceiver over the cellular frequency band of the PCell, the R-PDCCH message including cross-carrier scheduling information to schedule a downlink allocation over the backhaul link, the controller to trigger the mmWave transceiver to receive a downlink data packet from the second RN during the downlink allocation.

14 Claims, 11 Drawing Sheets

(51) Int. Cl.
*H04W 40/22* (2009.01)
*H04W 72/04* (2009.01)
*H04W 84/04* (2009.01)

(56) References Cited

U.S. PATENT DOCUMENTS

| | | | | |
|---|---|---|---|---|
| 8,559,950 | B2* | 10/2013 | Choi | H04L 5/0007 |
| | | | | 455/435.1 |
| 8,644,210 | B2* | 2/2014 | Chung | H04W 72/042 |
| | | | | 370/315 |
| 8,824,354 | B2* | 9/2014 | Ji | H04B 7/15542 |
| | | | | 370/315 |
| 9,014,073 | B2* | 4/2015 | Park | H04L 1/0003 |
| | | | | 370/312 |
| 9,118,381 | B2* | 8/2015 | Ode | H04B 7/15507 |
| 9,125,188 | B2* | 9/2015 | Tamaki | H04L 1/1854 |
| 9,185,700 | B2* | 11/2015 | Seo | H04J 11/0069 |
| 9,198,086 | B2* | 11/2015 | Obuchi | H04B 7/15507 |
| 9,210,622 | B2* | 12/2015 | Ji | H04W 36/0033 |
| 9,215,040 | B2* | 12/2015 | Yang | H04B 7/15542 |
| 9,215,057 | B2* | 12/2015 | Wager | H04B 7/14 |
| 9,246,662 | B2* | 1/2016 | Zhang | H04L 5/0098 |
| 9,264,956 | B2* | 2/2016 | Kim | H04W 36/0055 |
| 9,276,662 | B2* | 3/2016 | Seo | H04W 36/08 |
| 9,276,722 | B2* | 3/2016 | Gaal | H04L 5/0051 |
| 9,288,730 | B2* | 3/2016 | Al-Shalash | H04W 36/16 |
| 9,363,753 | B2* | 6/2016 | Damnjanovic | H04W 52/0229 |
| 9,425,923 | B2* | 8/2016 | Ratasuk | H04B 7/0623 |
| 9,462,582 | B2* | 10/2016 | Feng | H04L 27/2602 |
| 9,565,597 | B2* | 2/2017 | Obuchi | H04B 7/15528 |
| 9,572,088 | B2* | 2/2017 | Lee | H04W 48/08 |
| 9,603,060 | B2* | 3/2017 | Maeda | H04W 76/10 |
| 9,705,654 | B2* | 7/2017 | Ahmadi | H04L 5/0053 |
| 9,781,738 | B2* | 10/2017 | Pietraski | H04W 72/1263 |
| 2008/0075094 | A1* | 3/2008 | Ahn | H04B 7/155 |
| | | | | 370/400 |
| 2012/0176956 | A1 | 7/2012 | Ji et al. | |
| 2012/0282961 | A1 | 11/2012 | Bienas et al. | |
| 2013/0183971 | A1* | 7/2013 | Tamaki | H04W 36/0061 |
| | | | | 455/436 |
| 2013/0279400 | A1 | 10/2013 | Pan et al. | |
| 2013/0336198 | A1 | 12/2013 | Kim et al. | |
| 2014/0254469 | A1 | 9/2014 | Stephens et al. | |
| 2018/0249461 | A1* | 8/2018 | Miao | H04W 48/16 |

FOREIGN PATENT DOCUMENTS

| | | | | |
|---|---|---|---|---|
| CN | 103988546 | | 8/2014 | |
| JP | 2014515908 | | 7/2014 | |
| WO | 2013023171 | | 2/2013 | |
| WO | 2014124164 | | 8/2014 | |
| WO | WO2014124164 | * | 8/2014 | ............ H04B 7/155 |

OTHER PUBLICATIONS

Search Report for European Patent Application No. 15841667.7, dated Apr. 6, 2018, 8 pages.
International Preliminary Report on Patentability for PCT/US2015/049532, dated Mar. 30, 2017, 7 pages.
International Search Report and Written Opinion for PCT/US2015/049532, dated Jan. 27, 2016, 10 pages.
Ericsson et al., 'Control signaling enhancements for CA-based HetNet and inter-band deployments', R1-112920, 3GPP TSG-RAN WG1 #66bis, Zhuhai, China, Oct. 4, 2011, 6 pages.
Panasonic, 'Resource allocation schemes of R-PDCCH', R1-110214, 3GPP TSG RAN WG 1 Meeting #63bis, Dublin, Ireland, Jan. 31, 2011, 7 pages.
IEEE Std 802.11™-2012. IEEE Standard for Information technology—Telecommunications and information exchange between systems Local and metropolitan area networks—Specific requirements Part 11: Wireless LAN Medium Access Control (MAC) and Physical Layer (PHY) Specifications, Mar. 29, 2012, 2793 pages.
IEEE Std 802.11ad™-2012. IEEE Standard for Information technology—Telecommunications and information exchange between systems Local and metropolitan area networks—Specific requirements Part 11: Wireless LAN Medium Access Control (MAC) and Physical Layer (PHY) Specifications Amendment 3: Enhancements for Very High Throughput in the 60 GHz Band, Dec. 28, 2012, 628 pages.
3GPP TR 36.806 V9.0.0 (Mar. 2010) Technical Report, 3rd Generation Partnership Project; Technical Specification Group Radio Access Network; Evolved Universal Terrestrial Radio Access (E-UTRA); Relay architectures for E-UTRA (LTE-Advanced) (Release 9), 34 pages.
3GPP TR 36.216 V11.0.0 (Sep. 2012), Technical Specification 3rd Generation Partnership Project; Technical Specification Group Radio Access Network; Evolved Universal Terrestrial Radio Access (E-UTRA); Physical layer for relaying operation (Release 11), 16 pages.
Herve Bonneville et al., "Advanced relay technical proposals", ARTIST4G, https://ict-artist4g.eu, WP3 Deliverable 3.2, Feb. 2011, 161 pages.
Sub10systems, Liberator-V1000, 'The future of Wireless backhaul,' Gigabit Full-Duplex & All-Outdoor Wireless Backhaul at 60GHz, (http://www.sub10systems.com/wp-ontent/uploads/2014/02/SUB10_Flyer_V1000_jan14.pdf <http://www.sub10systems.com/wp-ontent/uploads/2014/02/SUB10_Flyer_V1000_jan1.pdf>), 2 pages.
3GPP TS 36.300 V11.7.0 (Sep. 2013); Technical Specification; 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11)), 209 pages.
Office Action for Chinese Patent Application No. 201580042858.7, dated Jan. 16, 2019, 10 pages.

* cited by examiner

APPARATUS, SYSTEM AND METHOD OF RELAY BACKHAULING WITH MILLIMETER WAVE CARRIER AGGREGATION

CROSS REFERENCE

This Application claims the benefit of and priority from US Provisional Patent Application No. 62/050,578 entitled "Millimeter Wave Carrier Aggregation for Multi-Hop Relay Backhauling", filed Sep. 15, 2014, the entire disclosure of which is incorporated herein by reference.

TECHNICAL FIELD

Some embodiments described herein generally relate to relay backhauling with millimeter wave carrier aggregation.

BACKGROUND

Some systems may implement a relay architecture, for example, as described by Long Term Evolution (LTE) Specifications, e.g., 3GPP TS 36.216, *"Physical layer for relaying operation (Release 11)", V11.0.0 (2012-09)*; and/or 3*GPP TR 36.806, "Relay architectures for E-UTRA (LTE-Advanced) (Release 9)", V9.0.0, (2010-03)*.

The relay architecture may be configured, for example, to provide coverage extension, capacity enhancement, and/or load balancing.

The relay architecture may implement a Relay Node (RN), which may serve as a "normal" Evolved Node B (eNB) from the point of view of a User Equipment (UE).

An in-band RN use case, in which an access link and a backhaul link may share the same radio resources, with the separation in time domain, may be deemed, in some scenarios, as a prioritized deployment option due, for example, to its efficient radio resource utilization and backwards compatibility with existing LTE UE and eNB procedures. However, this architecture may provide a limited backhauling capacity, which may not be able to support growing traffic demands.

There is a need for relay architectures and methods, which may be able to support an enhanced backhauling capacity for relay nodes, for example, to support increasing user data rate demand in the access link.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
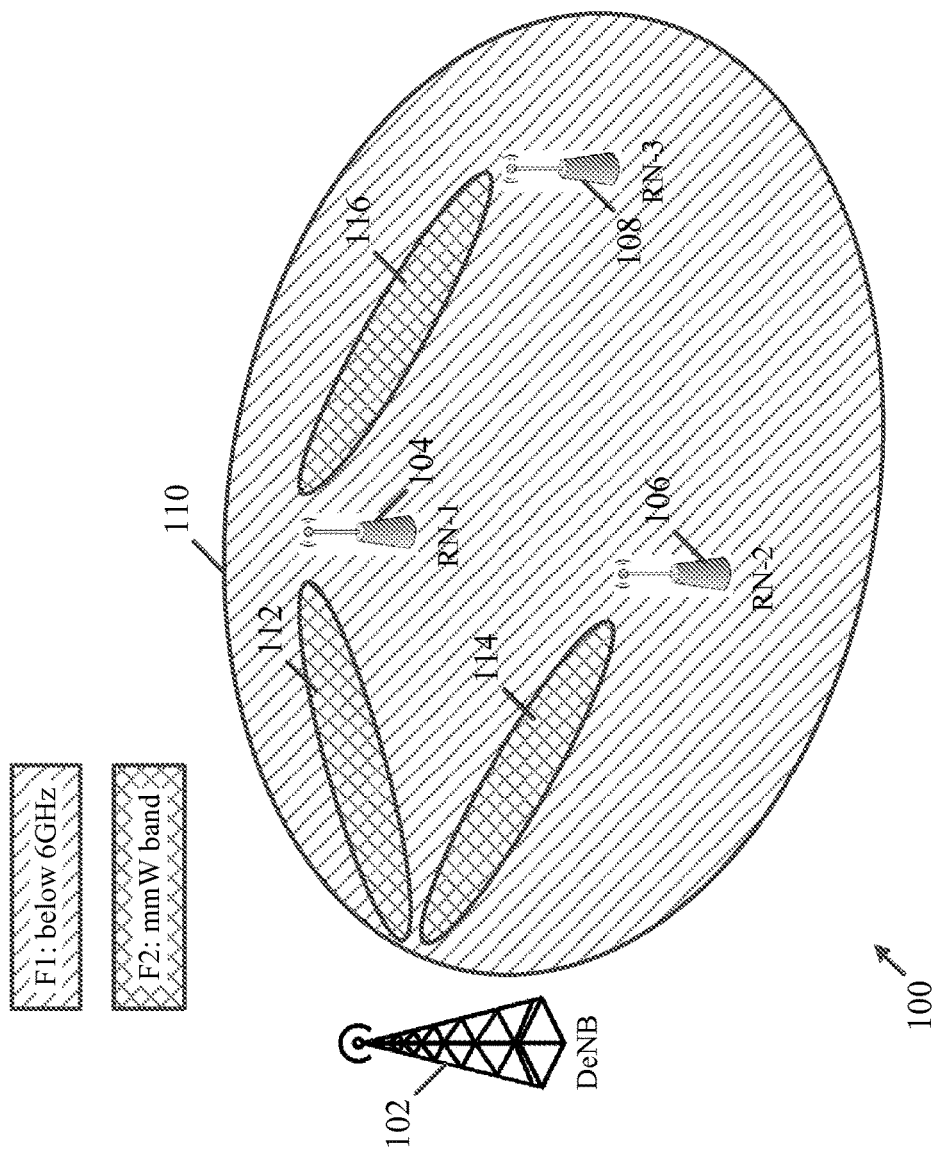
FIG. 1 is a schematic block diagram illustration of a system, in accordance with some demonstrative embodiments.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one embodiment," "an embodiment," "demonstrative embodiment," "various embodiments," etc., indicate that the embodiment(s) so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

Some embodiments may be used in conjunction with various devices and systems, for example, a User Equipment (UE), a Mobile Device (MD), a wireless station (STA), a Personal Computer (PC), a desktop computer, a mobile computer, a laptop computer, a notebook computer, a tablet computer, a Smartphone device, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wireless node, a cellular node, a relay node, a base station (BS), a wired or wireless router, a wired or wireless modem, a video device, an audio device, an audio-video (A/V) device, a wired or wireless network, a wireless area network, a cellular network, a cellular node, a cellular device, a Wireless Local Area Network (WLAN), a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, vending machines, sell terminals, and the like.

Some embodiments may be used in conjunction with devices and/or networks operating in accordance with existing Long Term Evolution (LTE) specifications (including 3GPP TS 36.300 (*3GPP TS 36.300 V11.7.0* (2013-09); *Technical Specification; 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11)*); 3GPP TS 36.216, (*3GPP TS 26.216 V11.0.0* (2012-09); *Physical layer for relaying operation (Release 11)*'); and/or 3GPP TR 36.806 (*3GPP TR 36.806 V9.0.0,* (2010-03); *Relay architectures for E-UTRA (LTE-Advanced) (Release 9)*), and/or future versions and/or derivatives thereof, devices and/or networks operating in accordance with existing IEEE 802.16 standards (*IEEE—Std 802.16, 2009 Edition, Air Interface for Fixed Broadband Wireless Access Systems; IEEE—Std 802.16e, 2005 Edition, Physical and Medium Access Control Layers for Combined Fixed and Mobile Operation in Licensed Bands; amendment to IEEE Std 802.16-2009, developed by Task Group m*) and/or future versions and/or derivatives thereof, devices and/or networks operating in accordance with existing IEEE 802.11 standards (*IEEE 802.11-2012, IEEE Standard for Information technology—Telecommunications and information exchange between systems Local and metropolitan area networks—Specific requirements Part 11: Wireless LAN Medium Access Control (MAC) and Physical Layer (PHY) Specifications, Mar.* 29, 2012; *IEEE 802.11ad ("IEEE P802.11ad-2012, IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 3: Enhancements for Very High Throughput in the 60 GHz Band",* 28 Dec., 2012); IEEE802.11-ay (*P802.11ay Standard for Information Technology—Telecommunications and Information Exchange Between Systems Local and Metropolitan Area Networks—Specific Requirements Part 11: Wireless LAN Medium Access Control (MAC) and Physical Layer (PHY) Specifications—Amendment: Enhanced Throughput for Operation in License-Exempt Bands Above* 45 *GHz*)) and/or future versions and/or derivatives thereof, units and/or devices which are part of the above networks, and the like.

Some embodiments may be used in conjunction with one or more types of wireless communication signals and/or systems, for example, Radio Frequency (RF), Frequency-Division Multiplexing (FDM), Orthogonal FDM (OFDM), Single Carrier Frequency Division Multiple Access (SC-FDMA), Time-Division Multiplexing (TDM), Time-Division Multiple Access (TDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wireless Fidelity (Wi-Fi), Wi-Max, ZigBee™, Ultra-Wideband (UWB), Global System for Mobile communication (GSM), second generation (2G), 2.5G, 3G, 3.5G, 4G, 4.5G, Fifth Generation (5G) mobile networks, 3GPP, Long Term Evolution (LTE) cellular system, LTE advance cellular system, LTE Unlicensed systems, High-Speed Downlink Packet Access (HSDPA), High-Speed Uplink Packet Access (HSUPA), High-Speed Packet Access (HSPA), HSPA+, Single Carrier Radio Transmission Technology (1×RTT), Evolution-Data Optimized (EV-DO), Enhanced Data rates for GSM Evolution (EDGE), and the like. Other embodiments may be used in various other devices, systems and/or networks.

The term "wireless device", as used herein, includes, for example, a device capable of wireless communication, a communication device capable of wireless communication, a communication station capable of wireless communication, a portable or non-portable device capable of wireless communication, or the like. In some demonstrative embodiments, a wireless device may be or may include a peripheral that is integrated with a computer, or a peripheral that is attached to a computer. In some demonstrative embodiments, the term "wireless device" may optionally include a wireless service.

The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit. The verb "communicating" may be used to refer to the action of transmitting or the action of receiving. In one example, the phrase "communicating a signal" may refer to the action of transmitting the signal by a first device, and may not necessarily include the action of receiving the signal by a second device. In another example, the phrase "communicating a signal" may refer to the action of receiving the signal by a first device, and may not necessarily include the action of transmitting the signal by a second device.

As used herein, the term "circuitry" may refer to, be part of, or include, an Application Specific Integrated Circuit (ASIC), an integrated circuit, an electronic circuit, a processor (shared, dedicated, or group), and/or memory (shared, dedicated, or group), that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

The term "antenna", as used herein, may include any suitable configuration, structure and/or arrangement of one or more antenna elements, components, units, assemblies and/or arrays. In some embodiments, the antenna may implement transmit and receive functionalities using separate transmit and receive antenna elements. In some embodiments, the antenna may implement transmit and receive functionalities using common and/or integrated transmit/receive elements. The antenna may include, for example, a phased array antenna, a single element antenna, a dipole antenna, a set of switched beam antennas, and/or the like.

The term "cell", as used herein, may include a combination of network resources, for example, downlink and optionally uplink resources. The resources may be controlled and/or allocated, for example, by a node (also referred to as a "base station"), or the like. The linking between a carrier frequency of the downlink resources and a carrier frequency of the uplink resources may be indicated in system information transmitted on the downlink resources.

Some demonstrative embodiments are described herein with respect to a LTE network. However, other embodiments may be implemented in any other suitable cellular network or system, e.g., a Universal Mobile Telecommunications System (UMTS) cellular system, a GSM network, a 3G cellular network, a 4G cellular network, a 4.5G network, a 5G cellular network, a WiMAX cellular network, and the like.

Some demonstrative embodiments may be used in conjunction with a Heterogeneous Network (HetNet), which may utilize a deployment of a mix of technologies, frequencies, cell sizes and/or network architectures, e.g., including cellular, millimeter wave ("mmWave" or "mmW"), and/or the like. In one example, the HetNet may include a radio access network having layers of different-sized cells ranging from large macrocells to small cells, for example, picocells and femtocells. Other embodiments may be used in conjunction with any other suitable wireless communication network.

In some demonstrative embodiments, a relay architecture using the mmWave frequency band for backhaul communication may be advantageous compared, for example, to a relay architecture in which backhauls link share the same radio resources, e.g., cellular radio resources, as access links. For example, using the mmWave frequency band for the backhaul links may enable supporting increasing traffic demands, which may be the result of increasing user data rate demand in the access links.

Some demonstrative embodiments may be configured to apply the mmWave frequency band to backhauling transmissions from one or more Relay Nodes (RNs) to a Donor evolved Node B (DeNB) DeNB, for example, even without requiring a deliberate and/or dedicated installation of a RN, for example, to ensure a line of sight (LOS) connection along the link between the DeNB and the RN.

Some demonstrative embodiments may be configured to apply the mmWave frequency band to backhauling transmissions from the RNs to the DeNB, for example, even without requiring a dual radio access technology (RAT), e.g., including Wireless-Gigabyte (WiGig) and LTE RATs, to be equipped at both the DeNB and the RN. Implementation of the dual RAT may not be optimal, for example, since radio resources in two RATs may be employed independently in the respective systems, and it may not be possible to jointly optimize radio resource utilization in both conventional broadband frequencies (e.g., under 6 GHz) and mmWave band (e.g., V-band or E-band).

In some demonstrative embodiments, one approach for incorporating the mmW band into the LTE relay backhauling system may include designing a stand-alone new carrier type (NCT) in the mmW band (also referred to as "mmW-NCT"), and the backhaul link in the out-band RN may employ the standalone mmW-NCT for the backhaul traffic transmission.

In some demonstrative embodiments, another approach may utilize a carrier aggregation (CA) method, e.g., a carrier aggregation method as defined in LTE Rel-10, or any other CA method, to semi-statically configure and activate the mmW-NCT as a secondary component carrier (SCC). According to this approach, scheduled data transmission in the mmW-NCT SCC may be dynamically signaled by a Relay Physical Downlink Control channel (R-PDCCH) from the DeNB to the RN. According to this approach, the RN may camp on the DeNB operating in the traditional broadband spectrum, e.g., as its primary cell (PCell), and additional capacity in the backhaul link may be, for example, boosted by one or more secondary cells (SCell) operating at the mmW-NCT.

In some demonstrative embodiments, the CA may not be explicitly specified for the LTE RN, however due to the "UE role" of the RN, the CA capability for the RN backhauling may be enabled, for example, by adding a new CA capability category to the RN, and signaling this new RN CA capability information to the network during an initial attachment procedure.

Reference is now made to FIG. 1, which schematically illustrates a block diagram of a system 100, in accordance with some demonstrative embodiments. In one example, cellular system 100 may include a $4^{th}$ generation cellular system such as, for example, a long-term evolution (LTE) or LTE advance cellular system, and the like, or a 5G cellular system. In other embodiments, system 100 may include any other cellular system.

As shown in FIG. 1, in some demonstrative embodiments, system 100 may include a plurality of nodes, e.g., including nodes 102, 104, 106, and/or 108, capable of communicating content, data, information and/or signals, e.g., as described below.

In some demonstrative embodiments, node 102 may include an Evolved Node B (eNB). For example, 102 may be configured to perform radio resource management (RRM), radio bearer control, radio admission control (access control), connection mobility management, resource scheduling between UEs and eNB radios, e.g., Dynamic allocation of resources to UEs in both uplink and downlink, header compression, link encryption of user data streams, packet routing of user data towards a destination, e.g., another eNB or an Evolved Packet Core (EPC), scheduling and/or transmitting paging messages, e.g., incoming calls and/or connection requests, broadcast information coordination, measurement reporting, and/or any other operations.

In other embodiments, nodes 104, 106, and/or 108 may include a Relay Node (RN), which may be configured, for example to relay communications from node 102 to one or more User Equipment (UEs). For example, node 104 may include a first RN, denoted RN-1, node 106 may include a second RN, denoted RN-2, and node 108 may include a third RN, denoted RN-3.

In some demonstrative embodiments, nodes 104, 106 and/or 108 may be configured to operate as eNBs and/or to provide one or more functionalities of an eNB, e.g., to one or more UEs, which may be connected to nodes 104, 106 and/or 108.

In some demonstrative embodiments, nodes 104, 106, and/or 108 may communicate with node 102 and/or with one or more other RNs, via one or more backhaul links, e.g., as described below.

In some demonstrative embodiments, node 102 may be configured to operate as a Donor eNB (DeNB) of a PCell 110, which may include nodes 104, 106, and/or 108.

In some demonstrative embodiments, node 102 may communicate with nodes 104, 106, and/or 108 over a cellular frequency band of PCell 100.

In some demonstrative embodiments, the cellular frequency band may include a frequency band of a macro spectrum frequency, denoted F1. For example, the cellular frequency band may include a frequency band below 6 Gigahertz (GHz). In one example, the cellular frequency band may include a frequency band within the frequency range of 700 Megahertz (MHz) and 2.7 GHz, or any other frequency band.

In some demonstrative embodiments, nodes 104, 106, and/or 108 may camp on the same DeNB, e.g., node 102, at the macro spectrum frequency F1.

In some demonstrative embodiments, backhaul communication between node 102 and nodes 104, 106, and/or 108 may be performed over the mmWave frequency band, denoted F2.

In some demonstrative embodiments, the mmWave frequency band may include a wireless communication frequency band, for example, an Extremely High Frequency (EHF) band, e.g., a frequency band within the frequency band of between 20 Ghz and 300 GHZ. For example, the mmWave frequency band may include a frequency band of 60 GHz. In one example, the mmWave frequency band may include a directional multi-gigabit (DMG)" or a "directional band" (DBand), for example, a frequency band wherein the Channel starting frequency is above 45 GHz. In other embodiments, the mmWave frequency band may include any other frequency band.

In some demonstrative embodiments, node 104 may communicate with node 102 via a backhaul link 112 over the mmWave frequency band, node 106 may communicate with node 102 via a backhaul link 114 over the mmWave frequency band, and/or node 108 may communicate with node 104 via a backhaul link 116 over the mmWave frequency band.

In some demonstrative embodiments, system 100 may implement one or more multi-hop relays for one or more backhaul links over a long distance, e.g., between a RN and node 102. For example, efficient communication over a mmWave link may be limited to a relatively short distance, for example, due to severe path loss and/or significant outage rate, for example, in outdoor non Line-of Sight (NLOS) mmWave communication.

In some demonstrative embodiments, for example, as shown in FIG. 1, nodes 104 and 106 may be relatively close to node 102 and, accordingly, node 104 may communicate directly with node 102 via backhaul link 112, and/or node 106 may communicate directly with node 102 via backhaul link 114. Node 108 may establish a backhaul connection with node 104 via backhaul link 116, for example, to enable indirect backhaul communication between node 108 and node 102, e.g., via node 104.

In some demonstrative embodiments, elements of system 100 may be configured to enable providing a Physical Downlink Control Channel (PDCCH) to inform node 108 about a data packet transmission, which is to forwarded from node 104 to node 106 on a SCC of the mmW-NCT, e.g., as described below.

Some demonstrative embodiments provide a plurality of different physical layer control signaling methods and/or schemes, which may be configured to enable reliably delivering control information to a RN (also referred to as "the targeted RN"), e.g., node 108, to enable the targeted RN to demodulate and/or decode a data packet on the mmW-NCT, e.g., as described below.

In some demonstrative embodiments, nodes 102, 104, 106 and/or 108 may be configured to communicate control plane data over the cellular frequency band of PCell 110.

In some demonstrative embodiments, the mmWave backhaul links 112, 114 and/or 116 may be configured to communicate user plane data in a plurality of mmW-NCT based SCells within PCell 110, e.g., as described below.

In some demonstrative embodiments, Relay-Physical-Downlink-Control-Channel (R-PDCCH) signaling messages may be transmitted in the PCell 110, for example, to enable at least benefits of existing robust design, and/or to maximize backwards compatibility.

In some demonstrative embodiments, a R-PDCCH message may be transmitted in the PCell 110, for example, to convey downlink data allocation and/or uplink scheduling request information for a data packet in a mmW-NCT SCell, e.g., as described below.

Some demonstrative embodiments may be configured, for example, to enable robust R-PDCCH signaling configured to signal downlink control information for a data packet transmitted on the mmW-NCT SCC of multi-hop relay backhaul links, for example, between DeNB 102 and node 108 via node 104, e.g., as described below.

Some demonstrative embodiments may be configured to utilize R-PDCCH based cross-carrier scheduling to support relay backhaul link capacity enhancement with mmW-NCT CA, e.g., as described below.

In some demonstrative embodiments, nodes 102, 104, 106 and/or 108 may be configured to adopt cross carrier scheduling for CA with mmW-NCT backhauling, e.g., as described below. Adopting the cross carrier scheduling for CA with mmW-NCT backhauling may be beneficial, for example, at least since such an approach may not require to design a completely new downlink control channel for the mmW-NCT CA operation, and/or may enable to utilize design benefits offered by the R-PDCCH for the mmW-NCT CA communication.

Figure 2:
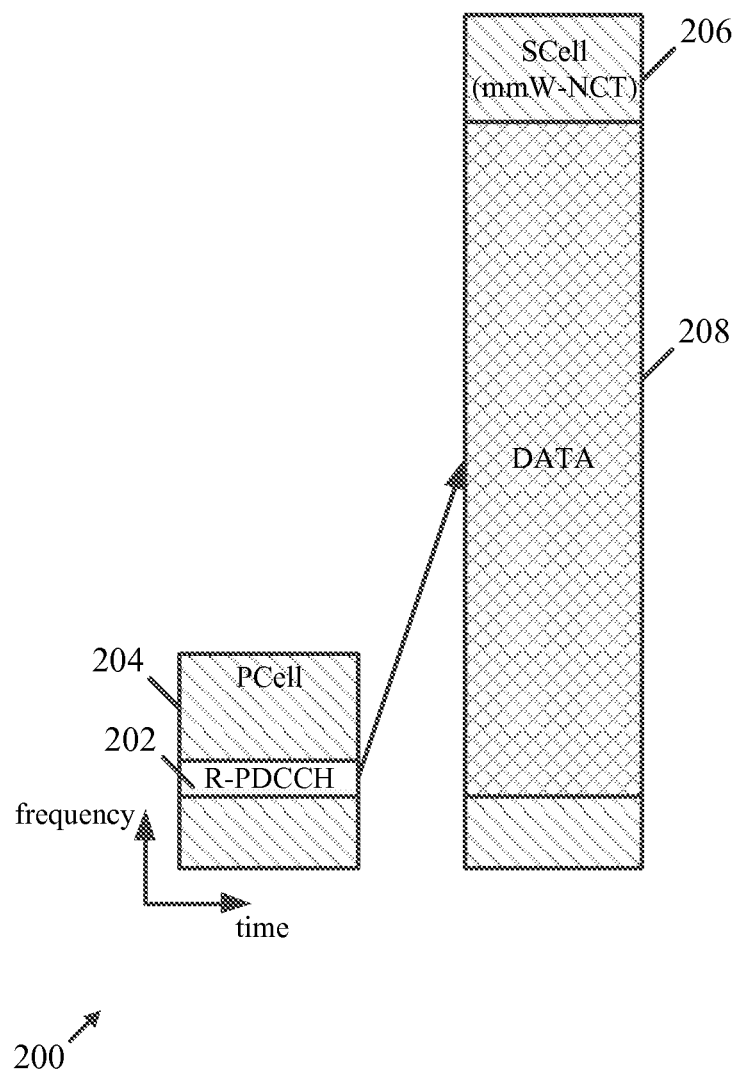
FIG. 2 is a schematic illustration of a cross-carrier scheduling scheme, in accordance with some demonstrative embodiments.

FIG. 2 is a schematic illustration of a cross-carrier scheduling scheme 200, in accordance with some demonstrative embodiments. In some demonstrative embodiments, nodes 102, 104, 106, and/or 108 (FIG. 1) may be configured to communicate cross-carrier signaling messages according to cross-carrier signaling scheme 200, e.g., as described below.

In some demonstrative embodiments, the cross-carrier scheduling scheme 200 may be configured, for example, for performing cross carrier scheduling with R-PDCCH for mmW-NCT CA for a relay backhaul link, e.g., as described below.

In some demonstrative embodiments, according to cross-carrier scheduling scheme 200, a node, e.g., node 102 (FIG. 1), may transmit a control plane message, for example, a R-PDCCH message 202 to a RN, e.g., node 108 (FIG. 1), over the frequency band of a PCell 204, e.g., PCell 110 (FIG. 1).

In some demonstrative embodiments, the R-PDCCH message 202 may include cross-carrier scheduling information to schedule a downlink allocation over a backhaul link of a SCell 206 to be used to communicate a user plane message, for example, a data packet 208, to the RN, e.g., as described below.

Some demonstrative embodiments are described herein with respect to a simplified use case of a single SCell, e.g., as shown in FIG. 2, to underline the principle how control and user plane may be split. In other embodiments, several S-cells may be combined, e.g., with a contiguous and/or non-contiguous band allocation, for example, according to available bandwidths of the mmW NCT, and/or bandwidth needs. Although some embodiments are described herein with respect to a single S-Cell NCT for mmW use cases, e.g., to explain the principle of R-PDCCH provision and U-plane data provision, in other embodiments one or more of the principles, methods and/or schemes may be implemented with respect to any other single and/or multiple S-cells.

In some demonstrative embodiments, the R-PDCCH message 202 may be configured to schedule the transmission of data packet 208 in the mmW-NCT SCCs along a multi-hop RN backhaul link, e.g., the multi-hop backhaul link between node 102 (FIG. 1) and node 108 (FIG. 1).

In some demonstrative embodiments, using the R-PDCCH message 202, which is communicated in the cellular frequency band, to schedule the transmission of data packet 208 in the mmW-NCT SCCs, may enable an RN, for example, node 108 (FIG. 1), to switch off and/or to power down a mmWave receiver of the RN, for example, when no data packet is scheduled; and/or to switch on and/or power on the mmWave receiver of the RN, for example, only when the data packet 208 is scheduled to be received by the RN in the mmW SCell. Accordingly, power consumption of the RN may be reduced.

In some demonstrative embodiments, the R-PDCCH message 202 may be transmitted by a centralized DeNB, e.g., node 102 (FIG. 1), for example, as described below with reference to FIGS. 4 and/or 5.

In some demonstrative embodiments, the R-PDCCH message 202 may be transmitted by a RN ("the upstream RN"), e.g., node 104 (FIG. 1), which is in connected with the targeted RN, e.g., RN 108 (FIG. 1), via a mmWave backhaul link, e.g., backhaul link 116 (FIG. 1), for example, as described below with reference to FIGS. 6 and/or 7.

In some demonstrative embodiments, the R-PDCCH message 202 may be transmitted by a RN ("the upstream RN"), e.g., node 104 (FIG. 1), which may serve as a DeNB for the targeted RN, e.g., RN 108 (FIG. 1), for example, as described below with reference to FIGS. 8 and/or 9.

Figure 3:
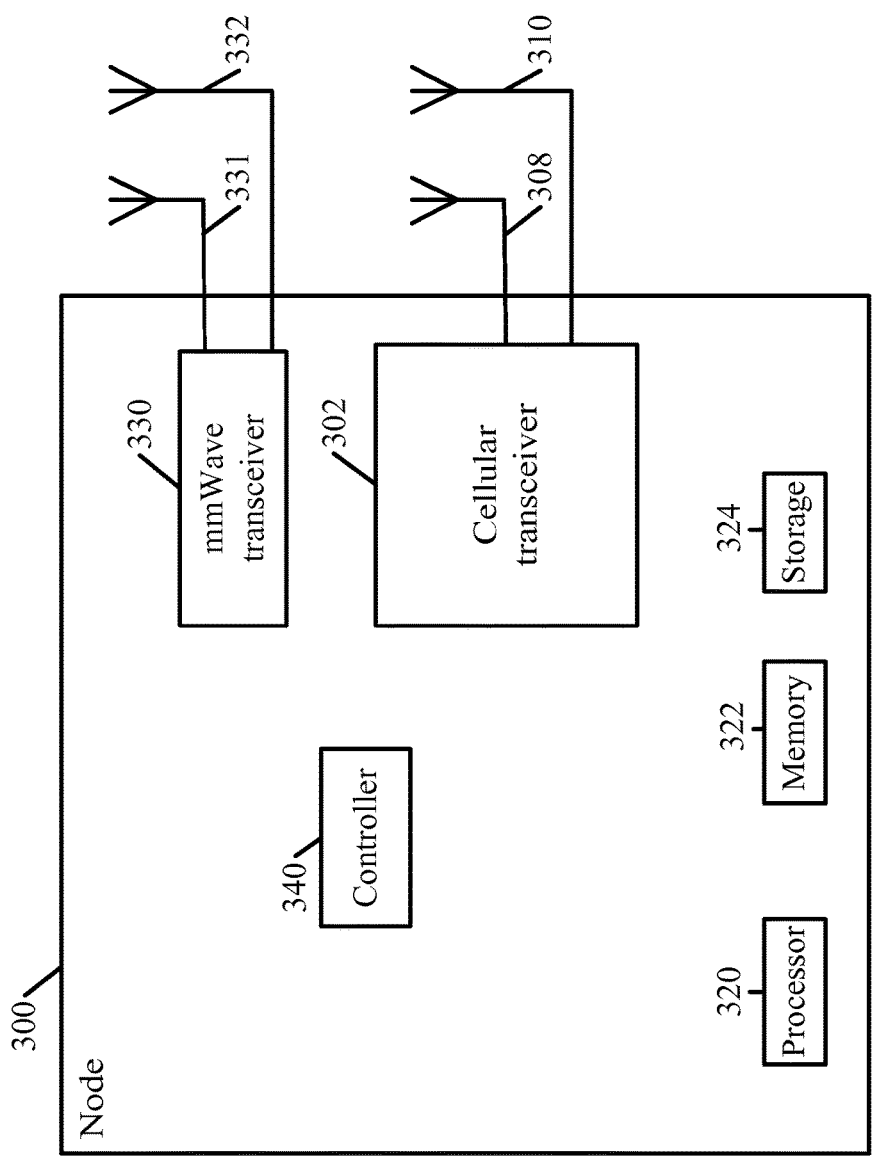
FIG. 3 is a schematic illustration of elements of a node, in accordance with some demonstrative embodiments.

Reference is made to FIG. 3, which schematically illustrates elements of a node 300, in accordance with some demonstrative embodiments.

In some demonstrative embodiments, an eNB operating as a DeNB, e.g., node 102 (FIG. 1), may include one or more of the elements of node 300, e.g., as described below.

In some demonstrative embodiments, a RN, e.g., node 104, 106 and/or 108 (FIG. 1), may include one or more of the elements of node 300, e.g., as described below.

In some demonstrative embodiments, node 300 may include a cellular transceiver (TRx) 302 configured to communicate over a cellular frequency band, for example, a cellular frequency band of a PCell, e.g., PCell 110 (FIG. 1). For example, node 102, node 104, node 106, and/or node 108 (FIG. 1) may include a cellular TRx 302.

In some demonstrative embodiments, cellular TRx 302 may include one or more wireless transmitters, receivers and/or transceivers including circuitry and/or logic configured to send and/or receive wireless communication signals, RF signals, frames, blocks, transmission streams, packets, messages, data items, and/or data.

In some demonstrative embodiments, cellular TRx 302 may include a multiple input multiple output (MIMO) transmitters receivers system (not shown), including circuitry and/or logic configured to perform antenna beamforming methods, if desired. In other embodiments, cellular TRx 302 may include any other transmitters and/or receivers.

In some demonstrative embodiments, cellular TRx 302 may include LTE, WCDMA and/or TD-SCDMA modulators and/or demodulator circuitry (not shown) configured to modulate and/or demodulate signals to be transmitted by, and/or signals received by, node 300.

In some demonstrative embodiments, cellular TRx 302 may include a turbo decoder and/or a turbo encoder (not shown) including circuitry and/or logic for encoding and/or decoding data bits into data symbols, if desired. In some demonstrative embodiments, cellular TRx 302 may include OFDM and/or SC-FDMA modulators and/or demodulators (not shown) configured to communicate OFDM signals over downlink (DL) channels, and/or SC-FDMA signals over uplink (UL) channels.

In some demonstrative embodiments, cellular TRx may include, or may be associated with, one or more antennas. In one example, cellular TRx may be associated with at least two antennas, e.g., antennas 308 and 310. In another example, cellular TRx may be associated with one antenna or more than two antennas.

In some demonstrative embodiments, antennas 308 and/or 310 may include any type of antennas suitable for transmitting and/or receiving wireless communication signals, blocks, frames, transmission streams, packets, messages and/or data. For example, antennas 308 and/or 310 may include any suitable configuration, structure and/or arrangement of one or more antenna elements, components, units, assemblies and/or arrays. For example, antennas 308 and/or 310 may include a phased array antenna, a dipole antenna, a single element antenna, a set of switched beam antennas, and/or the like.

In some embodiments, antennas 308 and/or 310 may implement transmit and receive functionalities using separate transmit and receive antenna elements. In some embodiments, antennas 308 and/or 310 may implement transmit and receive functionalities using common and/or integrated transmit/receive elements.

In some demonstrative embodiments, node 300 may include a mmWave transceiver (TRx) 330 configured to communicate between node 300 and one or more other nodes via one or more backhaul links over a mmWave frequency band. For example, node 102, node 104, node 106, and/or node 108 (FIG. 1) may include a mmWave TRx 330.

In some demonstrative embodiments, mmWave transceiver 330 may include one or more wireless receivers (Rx) including circuitry and/or logic to receive wireless communication signals, RF signals, frames, blocks, transmission streams, packets, messages, data items, and/or data; and/or one or more wireless transmitters (Tx) including circuitry and/or logic to send wireless communication signals, RF signals, frames, blocks, transmission streams, packets, messages, data items, and/or data.

In some demonstrative embodiments, mmWave transceiver 330 may include circuitry, logic, modulation elements, demodulation elements, amplifiers, analog to digital and digital to analog converters, filters, and/or the like, which may be configured to process one or more messages to be transmitted over the mmWave frequency band, and/or to process one or more messages received over the mmWave band.

In some demonstrative embodiments, mmWave transceiver 330 may include, or may be associated with, one or more directional antennas, e.g., including directional antennas 33 and/or 332. Antennas 331 and/or 332 may include any type of antennas suitable for transmitting and/or receiving wireless communication signals, blocks, frames, transmission streams, packets, messages and/or data over the mmWave frequency band. For example, antennas 331 and/or 332 may include any suitable configuration, structure and/or arrangement of one or more antenna elements, components, units, assemblies and/or arrays. Antennas 331 and/or 332 may include, for example, antennas suitable for directional communication, e.g., using beamforming techniques. For example, antennas 331 and/or 332 may include a phased array antenna, a multiple element antenna, a set of switched beam antennas, and/or the like. In some embodiments, antennas 331 and/or 332 may implement transmit and receive functionalities using separate transmit and receive antenna elements. In some embodiments, antennas 331 and/or 332 may implement transmit and receive functionalities using common and/or integrated transmit/receive elements.

In some demonstrative embodiments, antennas 332 and/or 332 may include directional antennas, which may be steered to a plurality of beam directions, e.g., to perform a directional communication over the mmWave frequency band.

In some demonstrative embodiments, mmWave transceiver 330 and cellular transceiver 302 may use separate antennas, e.g., as described above. In other embodiments, one or more antennas may be shared between mmWave transceiver 330 and cellular transceiver 302.

In some demonstrative embodiments, node 300 may include a controller 340 to control one or more functionalities of node 300 and/or to control one or more communications performed by node 300, e.g., as described below. For example, node 102, node 104, node 106, and/or node 108 (FIG. 1) may include controller 340.

In some demonstrative embodiments, controller 340 may include or may be implemented using suitable circuitry and/or logic, e.g., controller circuitry and/or logic, scheduler circuitry and/or logic, processor circuitry and/or logic, memory circuitry and/or logic, and/or any other circuitry and/or logic, which may be configured to perform at least part of the functionality of controller 340. Additionally or alternatively, one or more functionalities of controller 340 may be implemented by logic, which may be executed by a machine and/or one or more processors, e.g., as described below.

In some demonstrative embodiments, at least part of the functionality of controller 340 may be implemented by an integrated circuit, for example, a chip, e.g., a System on Chip (SoC). In one example, the chip or SoC may be configured to perform one or more functionalities of cellular transceiver 302 and/or mmWave transceiver 330. For example, the chip or SoC may include one or more elements of controller 340, and/or one or more elements of cellular transceiver 302 and/or mmWave transceiver 330. In one example, controller 340, cellular transceiver 302, and mmWave transceiver 330 may be implemented as part of the chip or SoC.

In other embodiments, controller 340, cellular transceiver 302 and/or mmWave transceiver 330 may be implemented by one or more additional or alternative elements of node 300.

In some demonstrative embodiments, node 300 may include, for example, one or more of a processor 320, a memory unit 322, and/or a storage unit 324. In one example, one or more of processor, 320 memory 322 and/or storage 324 may be implemented as one or more elements separate from transceiver 302, transceiver 330, and/or controller 340. In another example, one or more of processor, 320 memory 322 and/or storage 324 may be implemented as part of transceiver 302, transceiver 330, and/or controller 340.

In some demonstrative embodiments, processor 320 includes, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. Processor 320 executes instructions, for example, of an Operating System (OS) of node 300 and/or of one or more suitable applications.

In some demonstrative embodiments, memory unit 322 includes, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 324 includes, for example, a hard disk drive, a floppy disk drive, a Compact Disk (CD) drive, a CD-ROM drive, a DVD drive, or other suitable removable or non-removable storage units. Memory unit 322 and/or storage unit 324, for example, may store data processed by node 300.

Referring back to FIG. 1, in some demonstrative embodiments, node 108 may include a cellular transceiver, e.g., cellular transceiver 302 (FIG. 3), configured to communicate with a DeNB, e.g., node 102, over a cellular frequency band of a PCell, e.g., PCell 110.

In some demonstrative embodiments, node 108 may include a mmWave transceiver, e.g., mmWave transceiver 330 (FIG. 3), to communicate with a RN, e.g., node 104, via a backhaul link, e.g., backhaul link 116, over a mmWave frequency band of a SCell within the PCell 110.

In some demonstrative embodiments, node 108 may be configured to process a Relay-Physical-Downlink-Control-Channel (R-PDCCH) message received by node 108 over the cellular frequency band of the PCell 110. For example, node 108 may include a controller, e.g., controller 302 (FIG. 3), configured to process a R-PDCCH message, which may be received by the cellular transceiver 302 (FIG. 3) of node 108 over the cellular frequency band of PCell 110.

In some demonstrative embodiments, the R-PDCCH message may include cross-carrier scheduling information to schedule a downlink allocation over the backhaul link 116, for example, according to signaling scheme 200 (FIG. 2), e.g., as described below.

In some demonstrative embodiments, the controller 340 (FIG. 3) of node 108 may be configured to trigger the mmWave transceiver 330 (FIG. 3) of node 108 to receive a downlink data packet from the node 104 during the downlink allocation, which is signaled by the R-PDCCH message.

In some demonstrative embodiments, the cellular transceiver 302 (FIG. 3) of node 108 may be configured to receive the R-PDCCH message from the DeNB, e.g., from node 102, as described below.

In some demonstrative embodiments, the cellular transceiver 302 (FIG. 3) of node 108 may be configured to receive the R-PDCCH message from the RN 104, e.g., as described below.

Figure 4:
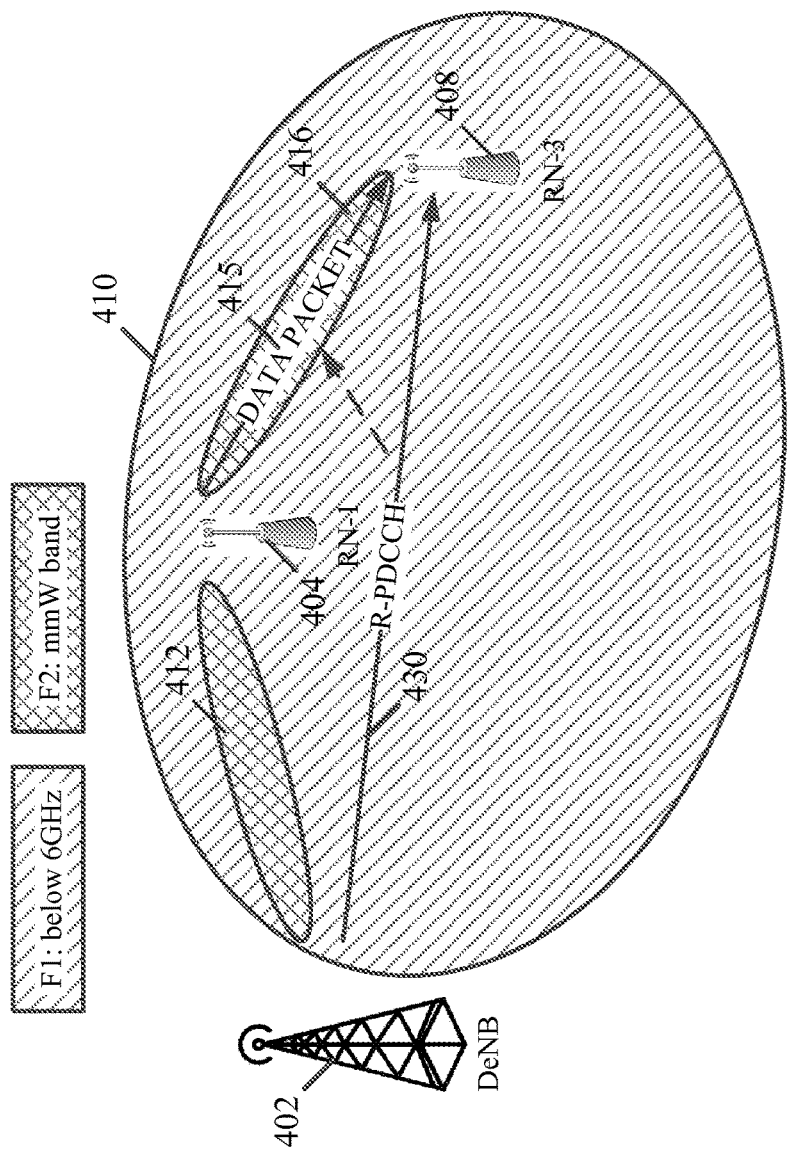
FIG. 4 is a schematic illustration of a scheduling scheme, in accordance with some demonstrative embodiments.

Reference is made to FIG. 4, which schematically illustrates a scheduling scheme, in accordance with some demonstrative embodiments.

In some demonstrative embodiments, as shown in FIG. 4, a DeNB 402 may be configured to communicate with a RN 404 and a RN 408 within a PCell 410. For example, DeNB 402 may perform the functionality of node 102 (FIG. 1), RN 404 may perform the functionality of node 104 (FIG. 1), and/or RN 408 may perform the functionality of node 108 (FIG. 1).

In some demonstrative embodiments, DeNB 402 may include a cellular transceiver, e.g., cellular transceiver 302 (FIG. 3), configured to communicate with RN 404 and RN 408 over a cellular frequency band of PCell 410.

In some demonstrative embodiments, DeNB 402 may be configured to transmit R-PDCCH messages to RNs of a macro cell, for example, to schedule communication of data packets in the mmW-NCT, e.g., along RN backhaul links between the RNs in PCell 410.

In some demonstrative embodiments, DeNB 402 may include a mmWave transceiver, e.g., mmWave transceiver 330 (FIG. 3), configured to communicate with one or more RNs in PCell 410 via one or more mmWave backhaul links.

For example, DeNB 402 may communicate with a first RN, e.g., RN 404, via a backhaul link, e.g., a backhaul link 412, over the mmWave frequency band.

In some demonstrative embodiments, one or more RNs in PCell 410 may have a multi-hop backhaul connection to DeNB 402. For example, a second RN, e.g., RN 408, may have a 2-hop connection to DeNB 402 via a mmWave backhaul link 416 between RN 408 and RN 404.

In some demonstrative embodiments, DeNB 402 may include a controller, e.g., controller 340 (FIG. 3), configured to trigger the cellular transceiver of DeNB 402 to transmit to the second RN, e.g., RN 408, a R-PDCCH message 430 including cross-carrier scheduling information to schedule a downlink allocation to communicate a data packet 415 over a backhaul link between the first RN and the second RN, e.g., the backhaul link 416 between RN 404 and RN 408.

In some demonstrative embodiments, for an n-hop RN in case of n>1, the R-PDCCH and associated data packet may be transmitted to the n-hop RN from different nodes. For example, DeNB 402 may transmit a R-PDCCH message to the n-hop RN, while the scheduled data packet in the mmW-NCT may be transmitted to the n-hop RN from an upstream RN. For example, as shown in FIG. 4, the RN 408 may receive the data packet 415 in the mmW-NCT over the mmWave backhaul link 416 from RN 404, while the R-PDCCH message 430, which schedules the transmission of data packet 415, may be transmitted from the DeNB 402 to the RN 408 via the cellular band.

In some demonstrative embodiments, DeNB 402 may be configured to send to RN 404, e.g., via the backhaul link 412, the data packet to be relayed to RN 416 via backhaul link 416, e.g., as described below.

In some demonstrative embodiments, DeNB 402 may be configured to transmit the R-PDCCH message 430 to RN 408 to schedule a Transmit Time Interval (TTI), in which the data packet 415 is to be sent from RN 404 to RN 408, e.g., as described below.

In some demonstrative embodiments, the controller 340 (FIG. 3) of DeNB 402 may be configured to manage the radio resource of the mmW-NCT for the mmWave backhaul link 416 from RN 404 to RN 408. According to these embodiments, RN 408 may view the RN 404 as a part of the DeNB 402, e.g., as a remote radio head, for example, in the sense that the RN 408 may have the DeNB 402 acting as its only donor eNB towards a radio core network.

In some demonstrative embodiments, DeNB 402 and RN 408 may be configured to communicate according to a signaling method, which may be configured, for example, to ensure a time alignment between the R-PDCCH message 430 and the associated data packet 415, which may be scheduled by the R-PDCCH message 430, for example, even though the R-PDCCH message 430 and the associated data packet 415 may be transmitted from different cells and/or sites.

In some demonstrative embodiments, DeNB 402 may be configured to control a timing alignment between the timing scheduled by the R-PDCCH message 430 on the cellular link between DeNB 402 and RN 408, and the timing of the communication of the data packet 415 on the mmWave backhaul link 416 between RN 404 and RN 408.

In some demonstrative embodiments, DeNB 402 may serve as the DeNB for both RN 404 and RN 408. Accordingly, in some demonstrative embodiments, the data transmission of the data packet 415 on the mmW-NCT from the RN 404 towards RN 408 may be, for example, realized by an uplink data scheduling, which may be requested by DeNB 402, e.g., as described below.

In some demonstrative embodiments, DeNB 402 may be configured to transmit to RN 408 a first R-PDCCH message, e.g., the R-PDCCH message 430, during a first Transmit Time Interval (TTI), e.g., as described below. The first R-PDCCH message may be configured schedule uplink transmission of a data packet from RN 404 to RN 408 over the backhaul link 416, for example, during or before a second TTI subsequent to the first TTI, e.g., as described below.

In some demonstrative embodiments, DeNB 402 may be configured to transmit to RN 404 a second R-PDCCH message during or before the second TTI, e.g., as described below.

In some demonstrative embodiments, the second R-PDCCH message may be configured to schedule the downlink reception of the data packet from the RN 404 at the RN 408, e.g., as described below.

In some demonstrative embodiments, configuring DeNB 402 to transmit to RN 404 the R-PDCCH 430 (FIG. 4) to schedule the transmission of the data packet 415 (FIG. 4) from RN 404 (FIG. 4) to RN 408 (FIG. 4) via mmWave backhaul link 416 (FIG. 4), e.g., as described above, may enable RN 408 to monitor only the R-PDCCH 430 (FIG. 4) from the DeNB 402 (FIG. 4).

In some demonstrative embodiments, configuring DeNB 402 to transmit to RN 404 the R-PDCCH 430 (FIG. 4) to schedule the transmission of the data packet 415 (FIG. 4) from RN 404 (FIG. 4) to RN 408 (FIG. 4) via mmWave backhaul link 416 (FIG. 4), e.g., as described above, may enable centralized control and/or optimization of the mmW-NCT radio resource, e.g., by DeNB 402. This scheme may utilize timing alignment, e.g., as described above, for example, since the R-PDCCH 430 (FIG. 4) and data packet 415 (FIG. 4) are transmitted from different sites. This scheme may also utilize a new and/or enhanced R-PDCCH procedure, e.g., as described below.

Figure 5:
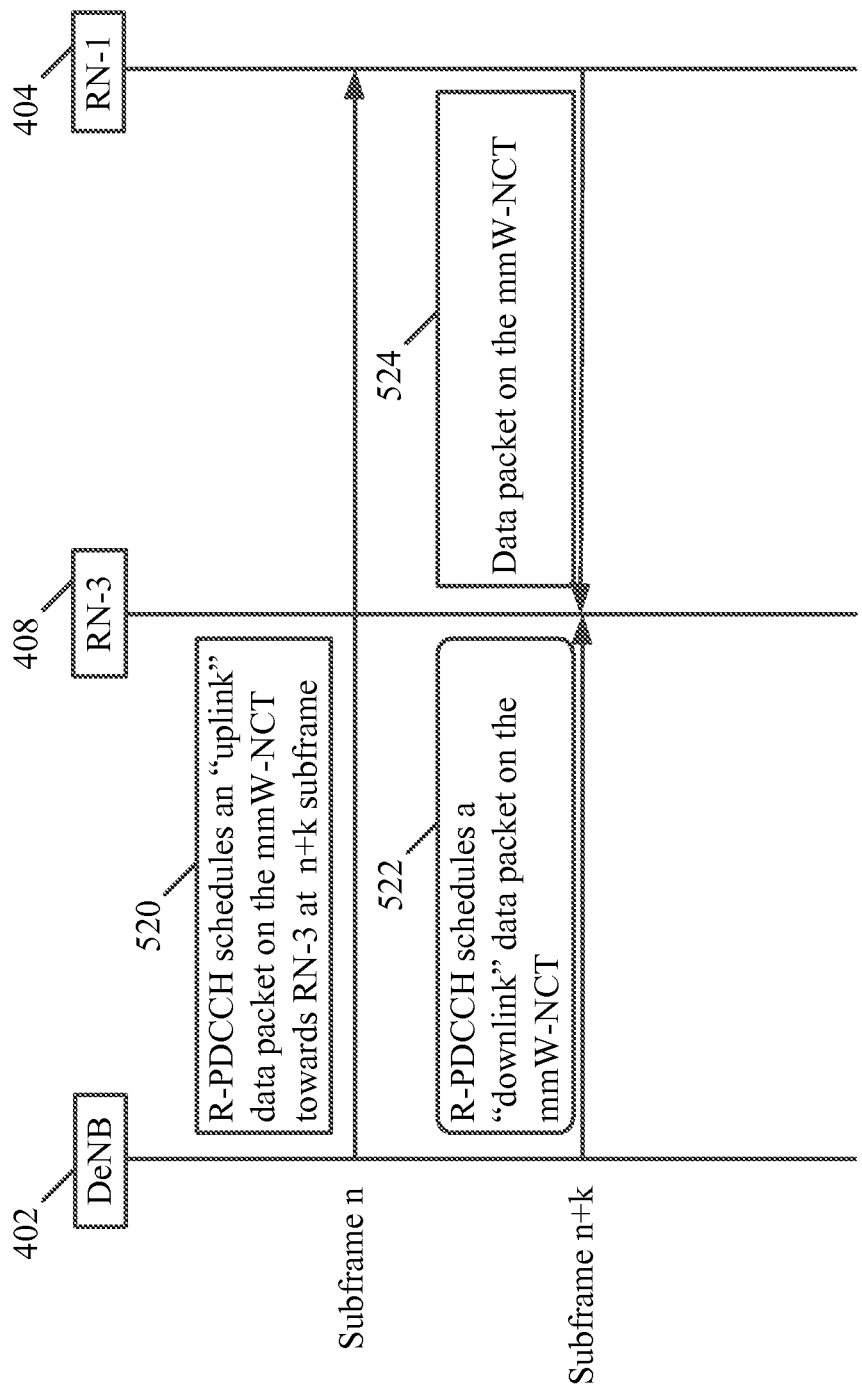
FIG. 5 is a schematic illustration of communications between nodes according to the scheduling scheme of FIG. 4, in accordance with some demonstrative embodiments.

Reference is also made to FIG. 5, which schematically illustrates communications and operations performed by DeNB 402, node 404, and node 408 according to the scheduling scheme of FIG. 4, in accordance with some demonstrative embodiments.

In some demonstrative embodiments, as shown in FIG. 5, at a first sub-frame, denoted n, the DeNB 402 may send a first R-PDCCH message 520 to the RN 404 to schedule an "uplink" transmission of a data packet, e.g., the data packet 451 (FIG. 4), to be transmitted from the RN 404 towards the RN 408 on the mmW-NCT link 416 (FIG. 4) at a subsequent sub-frame, e.g., at the sub-frame n+k.

In some demonstrative embodiments, as shown in FIG. 5, at the sub-frame n+k, the DeNB 402 may send to RN 408 a second R-PDCCH message configured 522 to schedule a "downlink" transmission of the data packet via the mmW-NCT link 416 (FIG. 4). The second R-PDCCH message 522 may be configured to schedule the "downlink" transmission at RN 408, for example, substantially in alignment with the "uplink" transmission scheduled for RN 404 by the first R-PDCCH message 520. Accordingly, for example, the RN 408 may be scheduled to receive the data packet from RN 404, e.g., during the same sub-frame, in which RN 404 is scheduled to transmit the data packet to RN 408.

In some demonstrative embodiments, the controller 340 (FIG. 3) of RN 408 may be configured to trigger the mmWave transceiver 330 (FIG. 3) of RN 408 to receive the downlink data packet via the backhaul link 416 (FIG. 4) during a TTI associated with the first R-PDCCH message 520, e.g., during the sub-frame n+k.

In some demonstrative embodiments, the signaling communications described above with respect to FIG. 5 may also be applied with respect to an inter-cell inter-site CA scheme.

Figure 6:
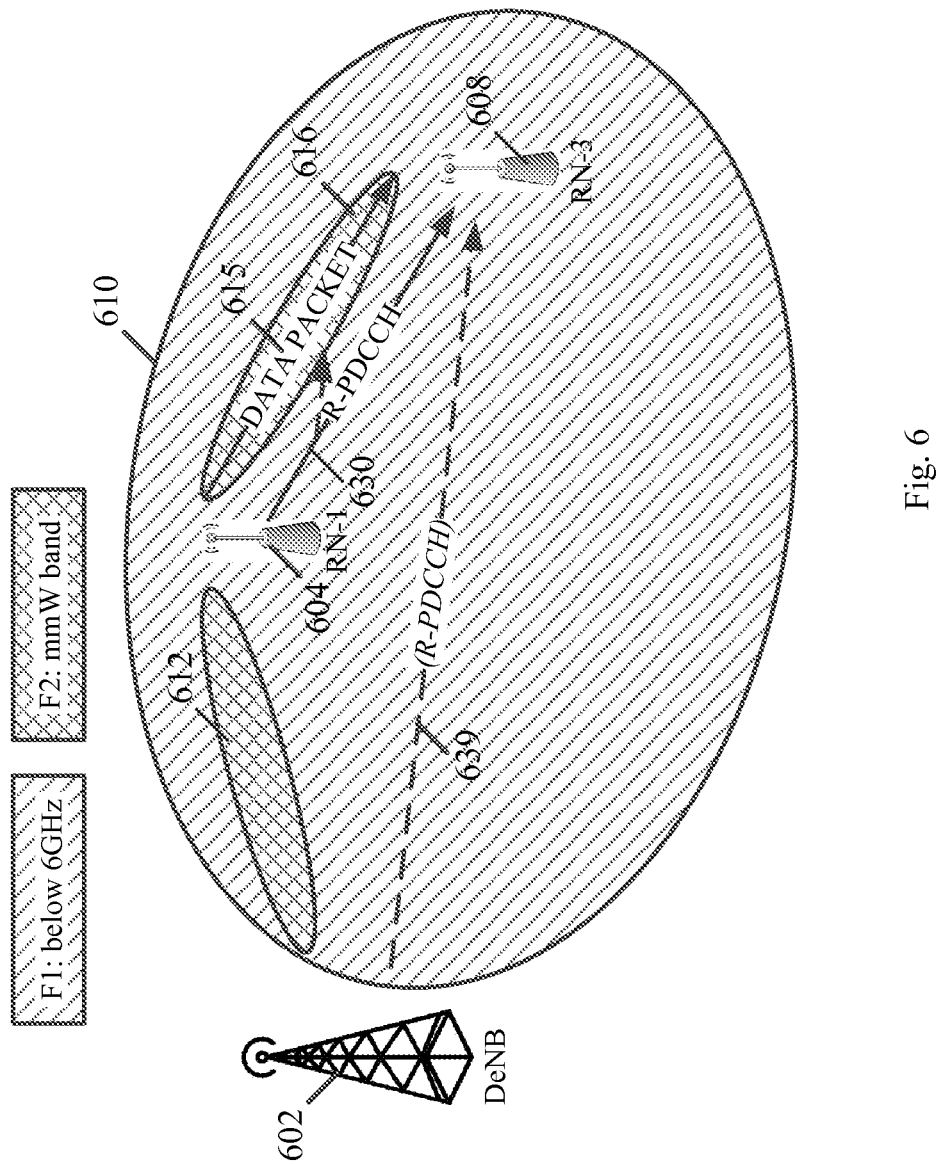
FIG. 6 is a schematic illustration of a scheduling scheme, in accordance with some demonstrative embodiments.

Reference is mad to FIG. 6, which schematically illustrates another scheduling scheme, in accordance with some demonstrative embodiments.

In some demonstrative embodiments, as shown in FIG. 6, a DeNB 602 may be configured to communicate with a RN 604 and a RN 608 within a PCell 610. For example, DeNB 602 may perform the functionality of node 102 (FIG. 1), RN 604 may perform the functionality of node 104 (FIG. 1), and/or RN 608 may perform the functionality of node 108 (FIG. 1).

In some demonstrative embodiments, DeNB 602 may include a cellular transceiver, e.g., cellular transceiver 302 (FIG. 3), configured to communicate with RN 604 and RN 608 over a cellular frequency band of PCell 610.

In some demonstrative embodiments, DeNB 602 may include a mmWave transceiver, e.g., mmWave transceiver 330 (FIG. 3), configured to communicate with one or more RNs in PCell 610 via one or more mmWave backhaul links.

For example, DeNB 602 may communicate with a first RN, e.g., RN 604, via a backhaul link, e.g., a backhaul link 612, over the mmWave frequency band.

In some demonstrative embodiments, one or more RNs in PCell 610 may have a multi-hop backhaul connection to DeNB 602. For example, a second RN, e.g., RN 608, may have a 2-hop connection to DeNB 602 via a mmWave backhaul link 616 between RN 604 and an upstream RN, e.g., RN 608.

In some demonstrative embodiments, DeNB 602 may be configured to send to RN 604, e.g., via backhaul link 612, a data packet to be relayed by RN 604 to RN 606 via backhaul link 616.

In some demonstrative embodiments, DeNB 602, RN 604 and/or RN 608 may be configured to enable RN 604 to transmit to RN 608 a R-PDCCH 630 associated with a data packet 615 to be relayed from RN 604 to RN 604, e.g., as described below.

In some demonstrative embodiments, DeNB 602 may configure multiple R-PDCCH sets to be monitored by the multi-hop RNs of PCell 610, e.g., RN 608, for example, such that the R-PDCCH 630 and the associated data packet 615 may be transmitted to a multi-hop RN from the same site, for example, from RN 604, e.g., as described below.

In some demonstrative embodiments, DeNB 602 may configure RN 608 to monitor two R-PDCCH sets, for example, including a first set of R-PDCCHs ("primary set of R-PDCCHs"), which may be transmitted from the DeNB 602, and a second set of R-PDCCHs ("secondary set of R-PDCCHs"), which may be transmitted by RN 604.

In some demonstrative embodiments, the RN 604 may use the secondary R-PDCCHs to convey to RN 608 downlink control information to schedule the transmission of the data packet 615 to RN 608 from the mmW-NCT of the RN 604, e.g., via mmWave backhaul link 616.

In some demonstrative embodiments, DeNB 602 may include a controller, e.g., controller 340 (FIG. 3), which may configure the primary set of R-PDCCHs to communicate primary R-PDCCH messages 639 between the DeNB 602 and RNs 604 and/or 608, and the secondary set of R-PDCCHs to communicate secondary R-PDCCH messages between RNs 604 and 608, e.g., as described below.

In some demonstrative embodiments, DeNB 602 may be configured to transmit to RN 608 a message including configuration information of the primary set of R-PDCCHs and the secondary set of R-PDCCHs, e.g., as described below.

In some demonstrative embodiments, DeNB 602 may be configured to transmit the configuration information of the primary and secondary R-PDCCH channels as part of a Radio Resource Control (RRC) message, or any other suitable type of message.

In some demonstrative embodiments, RN 608 may be configured to monitor two R-PDCCH sets, which may be transmitted from different sites, e.g., the primary R-PDCCH set from DeNB 602, and the secondary R-PDCCH set from RN 604.

In some demonstrative embodiments, DeNB 602 may be configured to send R-PDCCH signaling to an RN, e.g., RN 604, for example, when DeNB 602 is to send to the RN a backhaul link data packet from the PCell 610 using the Macro spectrum.

In some demonstrative embodiments, RN 604 may be configured to send R-PDCCH signaling to RN 608, for example, to schedule transmission of a backhaul link data packet 615 from RN 604 to RN 608, e.g., in the mmW-NCT SCC over backhaul link 616.

In some demonstrative embodiments, collocating the R-PDCCH signaling at RN 604, e.g., which is to transmit the data packet to RN 608, may enable to ensure a timing alignment between the R-PDCCH signaling and the data packet transmission to RN 608.

In some demonstrative embodiments, RN 608 may view the RN 604 as a part of the DeNB 602, e.g., as a remote radio head, in the sense that the RN 608 may have the DeNB 602 acting as its only donor eNB towards the radio core network.

Figure 7:
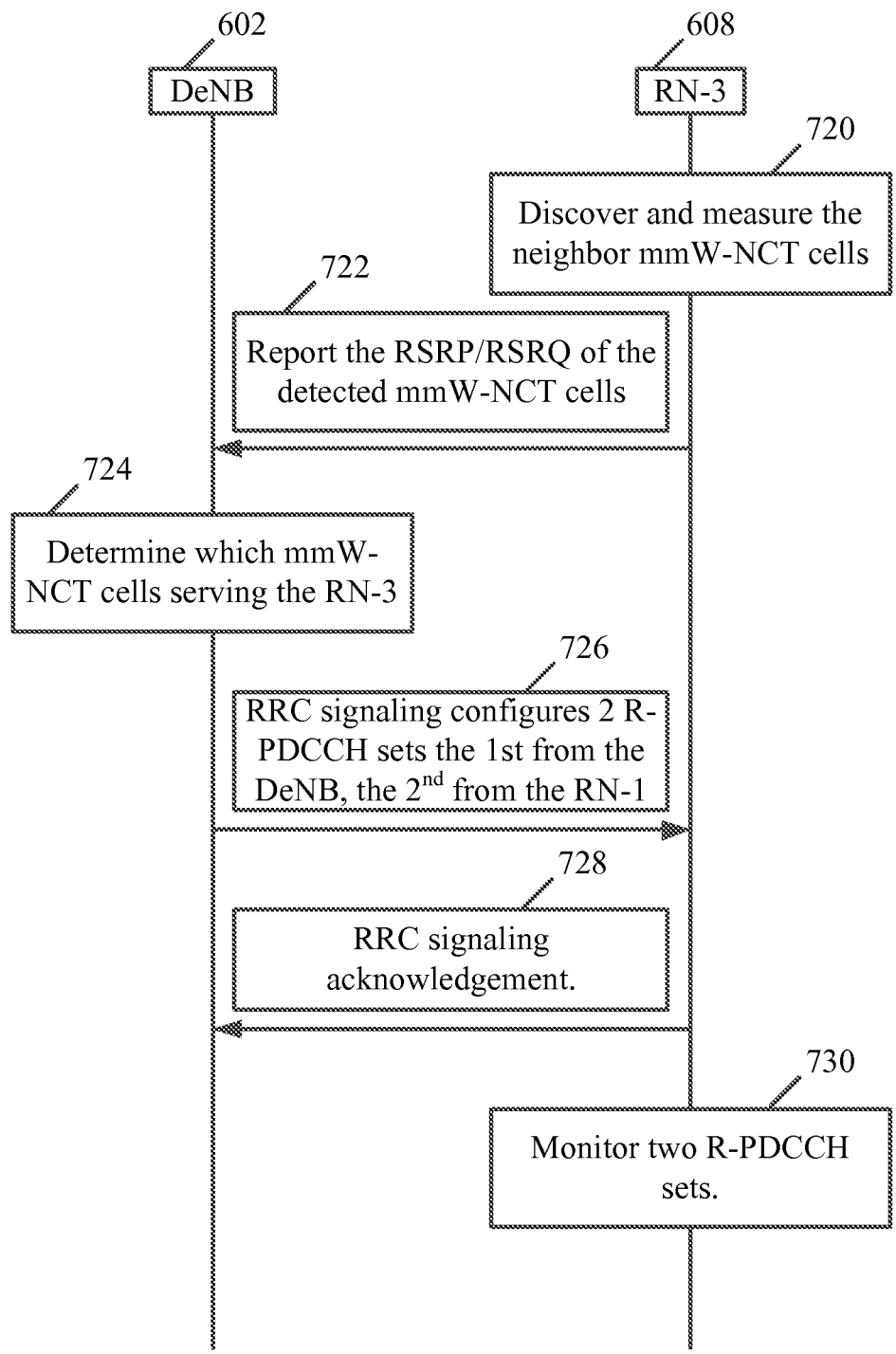
FIG. 7 is a schematic illustration of communications between nodes according to the scheduling scheme of FIG. 6, in accordance with some demonstrative embodiments.

Reference is made to FIG. 7, which schematically illustrates of communications and operations performed by DeNB 602 and RN 608 according to the scheduling scheme of FIG. 6, in accordance with some demonstrative embodiments.

In some demonstrative embodiments, as shown in FIG. 7, DeNB 602 and RN 608 may be configured to utilize RRC signaling to configure the primary R-PDCCH set and the secondary R-PDCCH set for RH 608, e.g., as described below.

In some demonstrative embodiments, as shown in FIG. 7, RN 608 may be configured to discover (720) one or more neighboring mmW-NCT cells, e.g., a SCell of RN 604 (FIG.

6). RN 608 may perform one or more measurements of one or more parameters corresponding to a discovered mmW-NCT cell, for example, a Reference Signal Received Power (RSRP) measurement, a Reference Signal Received Quality (RSRQ) measurement, and/or any other measurement.

In some demonstrative embodiments, as shown in FIG. 7, RN 608 may be configured to send to DeNB 602 a message 722, e.g., an RRC message, including a report of the measured parameters corresponding to one or more discovered mmW-NCT cells.

In some demonstrative embodiments, as shown in FIG. 7, DeNB 602 may be configured to determine (724) one or more mmW-NCT cells to serve the RN 604, for example, for relaying data packets from DeNB 602 to RN 608.

In some demonstrative embodiments, as shown in FIG. 7, DeNB 602 may be configured to send one or more RRC signaling messages 726 to RN 608, to signal to RN 608 the configuration of a primary R-PDCCH set to be used for scheduling communications between DeNB 602 and RN 608, and a second R-PDCCH set to be used for scheduling communications from an upstream RN, e.g., RN 604 (FIG. 6), to RN 608.

In some demonstrative embodiments, as shown in FIG. 7, RN 608 may be configured to send to DeNB 602 an RRC signaling acknowledgement 728 to acknowledge the configuration of the primary and secondary R-PDCCH sets.

In some demonstrative embodiments, as shown in FIG. 7, RN 608 may be configured to monitor (730) the primary and secondary R-PDCCH sets, e.g., according to the RRC signaling messages 726.

In some demonstrative embodiments, enabling DeNB 602 to configure the secondary R-PDCCH 630 (FIG. 6) to schedule the transmission of the data packet 615 (FIG. 6) from RN 604 (FIG. 6) to RN 608 (FIG. 6) via mmWave backhaul link 616 (FIG. 6), e.g., as described above, may enable transmission of the R-PDCCH 630 (FIG. 6) from the same site as the scheduled data packet 615 (FIG. 6) and, accordingly, may not require handling of a timing alignment.

In some demonstrative embodiments, enabling DeNB 602 to configure the secondary R-PDCCH 630 (FIG. 6) to schedule the transmission of the data packet 615 (FIG. 6) from RN 604 (FIG. 6) to RN 608 (FIG. 6) via mmWave backhaul link 616 (FIG. 6), e.g., as described above, may enable backhaul control and data traffic to be dynamically transmitted from the PCell and mmW-NCT SCell. This scheme may also utilize a new and/or enhanced definition of the multiple R-PDCCH sets, and/or new and/or enhanced RRC signaling, e.g., as described above.

Figure 8:
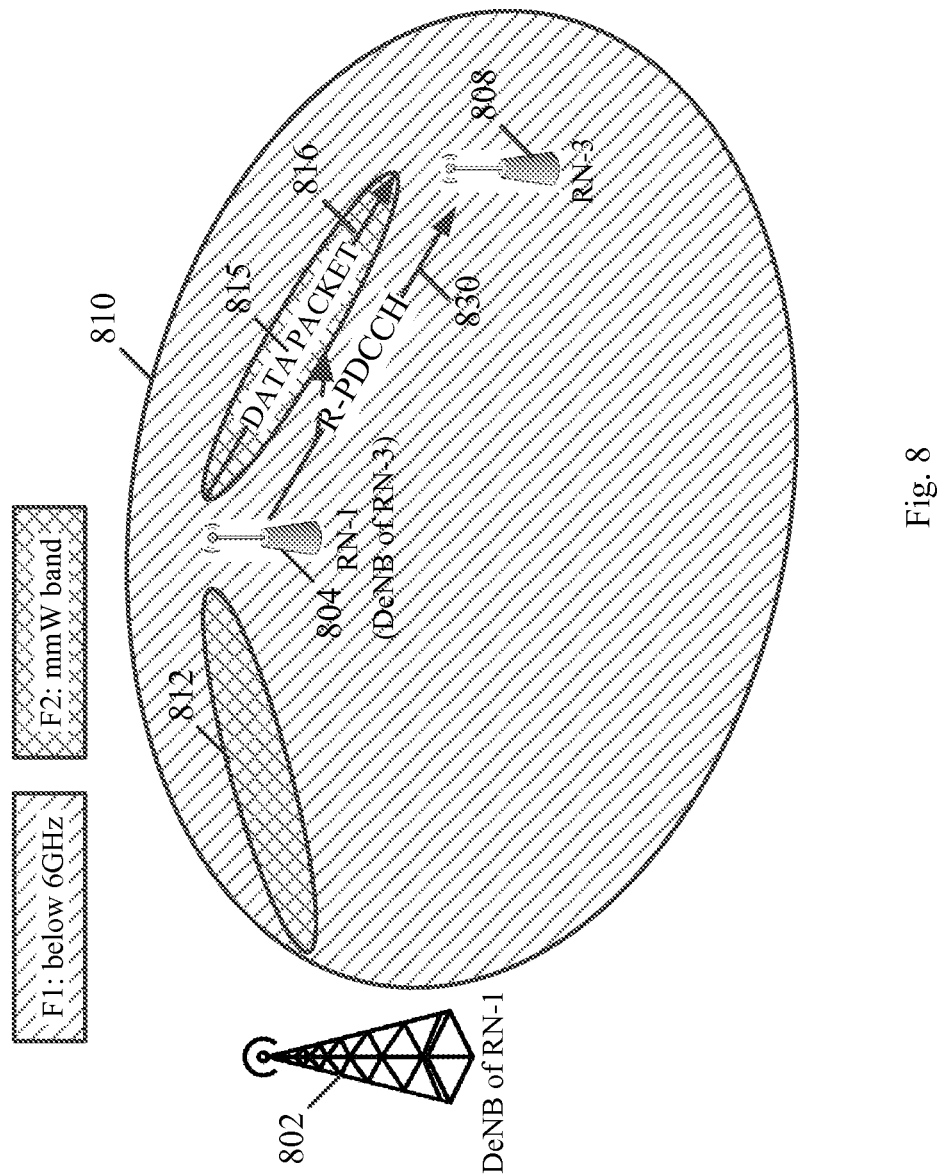
FIG. 8 is a schematic illustration of a scheduling scheme, in accordance with some demonstrative embodiments.

Reference is made to FIG. 8, which schematically illustrates another scheduling scheme, in accordance with some demonstrative embodiments.

In some demonstrative embodiments, as shown in FIG. 8, a DeNB 802 may be configured to communicate with a RN 804 and a RN 808 within a PCell 810. For example, DeNB 802 may perform the functionality of node 102 (FIG. 1), RN 804 may perform the functionality of node 104 (FIG. 1), and/or RN 808 may perform the functionality of node 108 (FIG. 1).

In some demonstrative embodiments, DeNB 802 may include a cellular transceiver, e.g., cellular transceiver 302 (FIG. 3), configured to communicate with RN 804 and RN 808 over a cellular frequency band of PCell 810.

In some demonstrative embodiments, DeNB 802 may include a mmWave transceiver, e.g., mmWave transceiver 330 (FIG. 3), configured to communicate with one or more RNs in PCell 810 via one or more mmWave backhaul links.

For example, DeNB 802 may communicate with a first RN, e.g., RN 804, via a backhaul link, e.g., a backhaul link 812, over the mmWave frequency band.

In some demonstrative embodiments, one or more RNs in PCell 810 may have a multi-hop backhaul connection to DeNB 802. For example, a second RN, e.g., RN 808, may have a 2-hop connection to DeNB 802 via a mmWave backhaul link 816 between RN 808 and RN 804.

In some demonstrative embodiments, DeNB 802 may be configured to trigger a first RN ("upstream RN"), e.g., RN 804, to serve as a DeNB for a second RN ("downstream RN"), e.g., RN 808. For example, the downstream RN may include an RN connected to DeNB 802 via n relay hops, and the upstream RN may include an RN connected to the downstream RN via a single relay hop. For example, the upstream RN may include an RN connected to DeNB 802 via n−1 relay hops.

In some demonstrative embodiments, DeNB 802 may include a controller, e.g., controller 340 (FIG. 3), configured to trigger a handover, for example, a two-step DeNB handover, to camp a first RN, e.g., RN 608, to a second RN, e.g., RN 604, according to a possible multi-hop routing path of mmW-NCT coverage provided by one or more SCells in PCell 810.

In some demonstrative embodiments, for example, as shown in the FIG. 8, in a first phase, DeNB 802 may serve as a DeNB for both RN 804 and RN 808.

In some demonstrative embodiments, information regarding mmW-NCT coverage may be reported to DeNB 802 by RN 804 and/or RN 808, for example, upon performing mmW-NCT coverage detection. The DeNB 802 may determine that two hop-1 mmW-NCT relay links may be formed, e.g., including a first mmWave link 812 (DeNB-to-RN-1) from DeNB 802 to RN 804, and a second link 816 (RN-1-to-RN-3) from RN 804 to RN 808. DeNB 802 may also determine that the mmW-NCT of the DeNB 802 cannot be detected by the RN 808.

In some demonstrative embodiments, DeNB 802 may decide to handover the RN 808 to the RN 804, for example, such that RN 804 may become the DeNB of the RN 808.

In some demonstrative embodiments, the controller of DeNB 802, e.g., controller 340 (FIG. 3), may be configured to trigger the cellular transceiver of DeNB 802, e.g., cellular TRx 320 (FIG. 3), to transmit to RN 804 a handover request to handover the RN 808 to the RN 804, e.g., as described below.

In some demonstrative embodiments, the controller of DeNB 802, e.g., controller 340 (FIG. 3), may be configured to trigger the cellular transceiver of DeNB 802, e.g., cellular TRx 302 (FIG. 3), to transmit to RN 808 an attach request to attach to the RN 804, e.g., as described below.

In some demonstrative embodiments, after camping on the RN 804, the RN 808 may only be required to monitor an R-PDCCH 830 transmitted from the RN 804, for example, to determine whether a data packet 815 is scheduled in the mmW-NCT of the RN 804.

In some demonstrative embodiments, the controller of DeNB 802, e.g., controller 340 (FIG. 3), may be configured to trigger the mmWave transceiver of DeNB 802, e.g., mmWave TRx 330 (FIG. 3), to transmit to the RN 804 via the backhaul link 812 the data packet 815 to be relayed to the RN 808, e.g., via the mmWave backhaul link 816.

In some demonstrative embodiments, the handover request message and/or the attach request message may include Radio Resource Control (RRC) messages, e.g., as described below.

Figure 9:
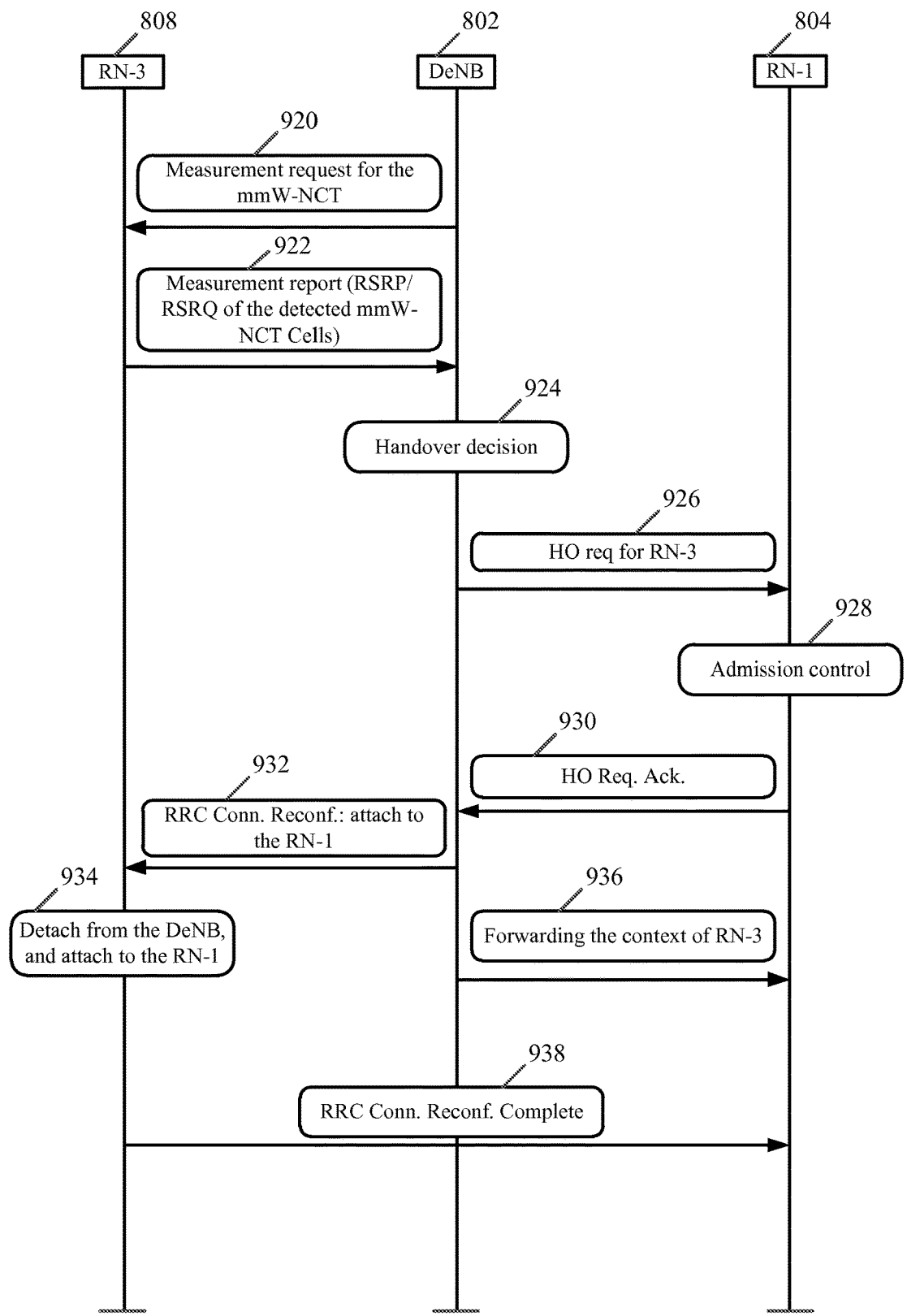
FIG. 9 is a schematic illustration of communications between nodes according to the scheduling scheme of FIG. 8, in accordance with some demonstrative embodiments.

FIG. 9 is a schematic illustration of communications and operations performed by DeNB 802, RN 804, and RN 808 according to the scheduling scheme of FIG. 8, in accordance with some demonstrative embodiments.

In some demonstrative embodiments, as shown in FIG. 9, DeNB 802 may be configured to send to RN 808 a measurement request 920 to request measurements of one or more parameters of one or more mmW-NCT links, which may be detected by RN 808.

In some demonstrative embodiments, RN 808 may perform one or more measurements of one or more parameters corresponding to a discovered mmW-NCT cell, for example, a RSRP measurement, a RSRQ measurement, and/or any other measurement. The RN 808 may send to DeNB 802 a message 922, e.g., an RRC message, including a report of the measured parameters corresponding to one or more discovered mmW-NCT cells.

In some demonstrative embodiments, as shown in FIG. 9, DeNB 802 may be configured to make a handover decision (924), e.g., based on the measurements corresponding to the discovered mmW-NCT cells. For example, as shown in FIG. 9, DeNB 902 may decide to handover RN 808 to RN 804.

In some demonstrative embodiments, as shown in FIG. 9, DeNB 802 may be configured to send to RN 804 a Handover (HO) request 926 to handover RN 808 to RN 806.

In some demonstrative embodiments, as shown in FIG. 9, RN 804 may be configured to perform one or more admission control operations (928) corresponding to the handover.

In some demonstrative embodiments, as shown in FIG. 9, RN 804 may be configured to send to DeNB 802 a HO request acknowledgement 930, for example, to acknowledge the handover of RN 808.

In some demonstrative embodiments, as shown in FIG. 9, DeNB 802 may be configured to transmit to RN 808 an RRC message, for example, an RRC connection reconfiguration message 932, to trigger RN 808 to attach to RN 804.

In some demonstrative embodiments, as shown in FIG. 9, RN 808 may be configured to perform one or more operations (934) to detach from DeNB 802 and to attach to RN 804.

In some demonstrative embodiments, as shown in FIG. 9, DeNB 802 may be configured to forward to RN 804 context (936) corresponding to RN 808, to enable RN 804 to serve as a DeNB from RN 808.

In some demonstrative embodiments, as shown in FIG. 9, RN 808 may be configured to send to RN 804 an RRC message, for example, an RRC Reconfiguration Complete message 938, upon successfully completing the detachment from DeNB 802 and the attaching to RN 804.

In some demonstrative embodiments, enabling DeNB 802 to handover RN 808 (FIG. 8) to RN 804 (FIG. 8), e.g., as described above, may enable transmission of the R-PDCCH 830 (FIG. 8) from the same site as the scheduled data packet 815 (FIG. 8). This scheme may require performing a donor eNB handover procedure, and may require RN 804 (FIG. 8) to be configured to be able to serve as a DeNB.

Figure 10:
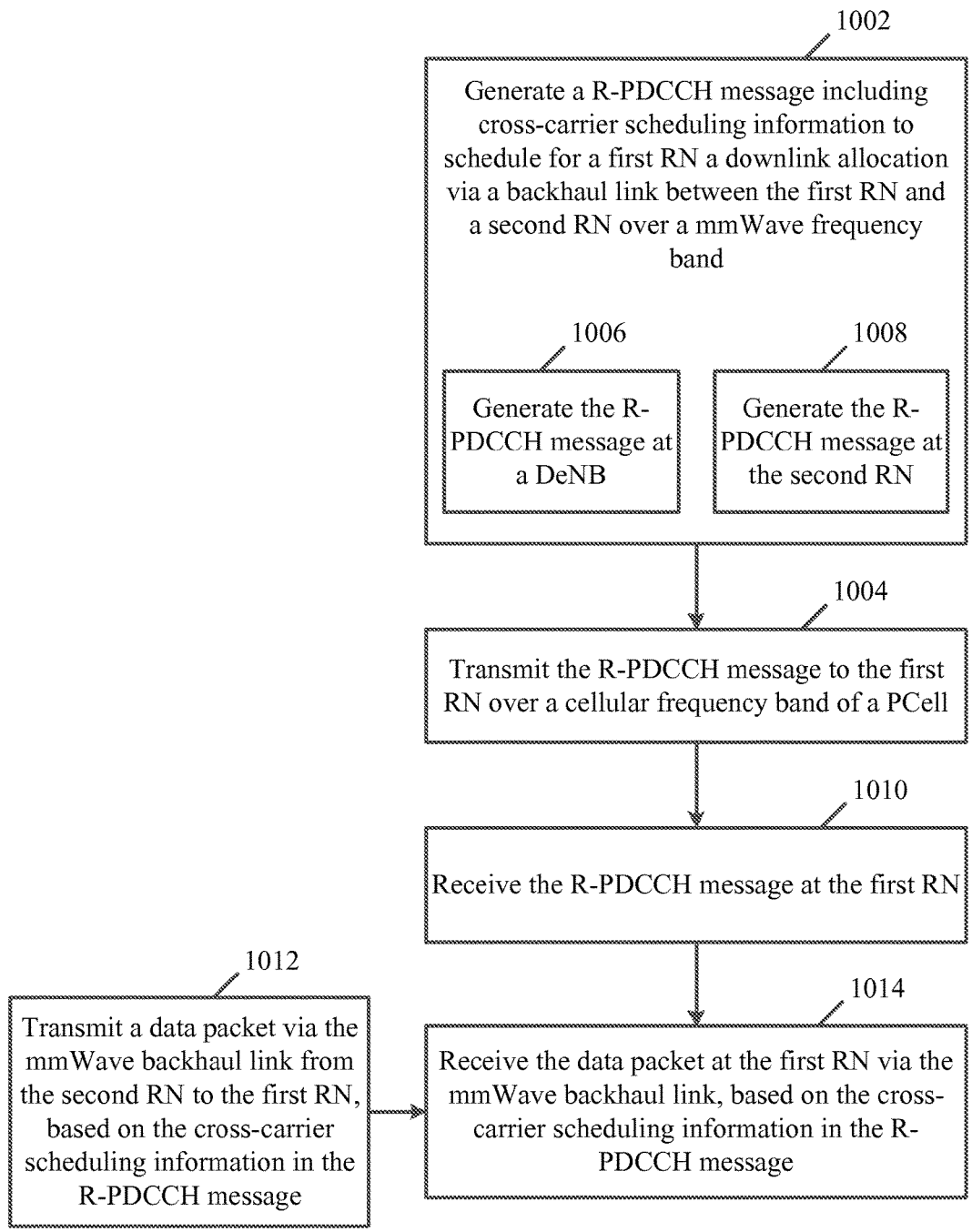
FIG. 10 is a schematic flow-chart illustration of a method of relay backhauling, in accordance with some demonstrative embodiments.

Reference is made to FIG. 10, which schematically illustrates a method of relay backhauling, in accordance with some embodiments. In some embodiments, one or more of the operations of the method of FIG. 10 may be performed by one or more elements of a system, e.g., system 100 (FIG. 1), a node, e.g., node 102 (FIG. 1), node 104 (FIG. 1), node 106 (FIG. 1), and/or node 108 (FIG. 1), a DeNB, e.g., DeNB 402 (FIG. 4), DeNB 602 (FIG. 6), and/or DeNB 802 (FIG. 8), a RN, e.g., RN 404 (FIG. 4), RN 408 (FIG. 4), RN 604 (FIG. 6), RN 608 (FIG. 6), RN 804 (FIG. 8), and/or RN 808 (FIG. 8), and/or a controller, e.g., controller 340 (FIG. 3).

As indicated at block 1002, the method may include generating a R-PDCCH message including cross-carrier scheduling information to schedule for a first RN a downlink allocation via a backhaul link between the first RN and a second RN over a mmWave frequency band. For example, the R-PDCCH message may be configured to schedule transmission of a data packet from the second RN to the first RN according to the cross-carrier scheduling scheme 200 (FIG. 2).

As indicated at block 1004, the method may include transmitting the R-PDCCH message to the first RN over a cellular frequency band of a PCell.

As indicated at block 1006, generating the R-PDCCH message may include generating the R-PDCCH message at a DeNB. For example, DeNB 402 (FIG. 4) may generate and transmit R-PDCCH message 430 (FIG. 4) to RN 408 (FIG. 4) over the cellular frequency band of PCell 410 (FIG. 4), e.g., as described above.

As indicated at block 1008, generating the R-PDCCH message may include generating the R-PDCCH message at the second RN. In one example, RN 604 (FIG. 6) may generate and transmit R-PDCCH message 630 (FIG. 6) to RN 608 (FIG. 6) over the cellular frequency band of PCell 610 (FIG. 6), e.g., as described above. In another example, RN 804 (FIG. 8) may generate and transmit R-PDCCH message 830 (FIG. 8) to RN 808 (FIG. 8) over the cellular frequency band of PCell 810 (FIG. 8), e.g., as described above.

As indicated at block 1010, the method may include receiving the R-PDCCH message at the first RN. For example, node 108 (FIG. 1) may be configured to receive and process, e.g., demodulate and/or decode, the R-PDCCH message, for example, from node 102 (FIG. 1), or from node 104 (FIG. 1), e.g., as described above.

As indicated at block 1012, the method may include transmitting a data packet via the mmWave backhaul link from the second RN to the first RN, based on the cross-carrier scheduling information in the R-PDCCH message. For example, node 104 (FIG. 1) may transmit the data packet to node 108 (FIG. 1) via backhaul link 116 (FIG. 1), e.g., as described above.

As indicated at block 1014, the method may include receiving the data packet at the first RN via the mmWave backhaul link, based on the cross-carrier scheduling information in the R-PDCCH message. For example, node 108 (FIG. 1) may operate over the mmWave backhaul link to receive the data packet from node 104 (FIG. 1), based on the cross-carrier scheduling information in the R-PDCCH message, e.g., as described above.

Figure 11:
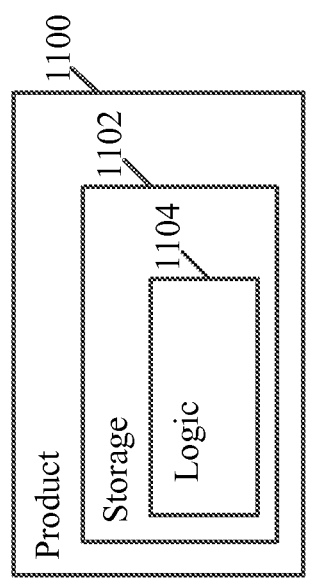
FIG. 11 is a schematic illustration of a product, in accordance with some demonstrative embodiments.

Reference is made to FIG. 11, which schematically illustrates a product of manufacture 1100, in accordance with some demonstrative embodiments. Product 1100 may include a non-transitory machine-readable storage medium 1102 to store logic 1104, which may be used, for example, to perform at least part of the functionality of node 102 (FIG. 1), node 104 (FIG. 1), node 106 (FIG. 1), node 108 (FIG. 1), DeNB 402 (FIG. 4), DeNB 602 (FIG. 6), DeNB 802 (FIG. 8), RN 404 (FIG. 4), RN 408 (FIG. 4), RN 604 (FIG. 6), RN 608 (FIG. 6), RN 804 (FIG. 8), RN 808 (FIG. 8), controller 340 (FIG. 3), mmwave transceiver 330 (FIG. 3), and/or cellular TRx 302 (FIG. 3), and/or to perform one or more operations discussed above with reference to FIGS. 5, 7, 9 and/or 10. The phrase "non-transitory machine-readable medium" is directed to include all computer-readable media, with the sole exception being a transitory propagating signal.

In some demonstrative embodiments, product 1100 and/or machine-readable storage medium 1102 may include one or more types of computer-readable storage media capable of storing data, including volatile memory, non-volatile memory, removable or non-removable memory, erasable or non-erasable memory, writeable or re-writeable memory, and the like. For example, machine-readable storage medium 1102 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative embodiments, logic 1104 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative embodiments, logic 1104 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

EXAMPLES

The following examples pertain to further embodiments.

Example 1 includes a first Relay Node (RN) comprising a cellular transceiver configured to communicate with a Donor evolved Node B (DeNB) over a cellular frequency band of a Primary cell (PCell); a millimeter-wave (mmWave) transceiver to communicate with a second RN via a backhaul link over a mmWave frequency band of a Secondary cell (SCell) within the PCell; and a controller to process a Relay-Physical-Downlink-Control-Channel (R-PDCCH) message received by the cellular transceiver over the cellular frequency band of the PCell, the R-PDCCH message comprising cross-carrier scheduling information to schedule a downlink allocation over the backhaul link, the controller to trigger the mmWave transceiver to receive a downlink data packet from the second RN during the downlink allocation.

Example 2 includes the subject matter of Example 1, and optionally, wherein the cellular transceiver is to receive the R-PDCCH message from the DeNB Example 3 includes the subject matter of Example 2, and optionally, wherein the downlink data packet comprises a data packet from the DeNB relayed via the second RN.

Example 4 includes the subject matter of Example 2 or 3, and optionally, wherein the controller is to trigger the mmWave transceiver to receive the downlink data packet via the backhaul link during a Transmit Time Interval (TTI) associated with the R-PDCCH message.

Example 5 includes the subject matter of Example 1, and optionally, wherein the cellular transceiver is to receive the R-PDCCH message from the second RN.

Example 6 includes the subject matter of Example 5, and optionally, wherein the R-PDCCH message comprises a secondary R-PDCCH message, the cellular transceiver is to receive from the DeNB a primary R-PDCCH message to schedule an allocation over the cellular frequency band.

Example 7 includes the subject matter of Example 6, and optionally, wherein the controller is to configure, according to a Radio Resource Control (RRC) message from the DeNB, a setting of a primary R-PDCCH set with the DeNB and a secondary R-PDCCH set with the second RN.

Example 8 includes the subject matter of Example 5, and optionally, wherein the controller is to handover the first RN from the DeNB to the second RN based on a handover request from the DeNB, and to receive the R-PDCCH message from the second RN after the handover to the second RN.

Example 9 includes the subject matter of any one of Examples 1-8, and optionally, comprising one or more antennas, a memory and a processor.

Example 10 includes an evolved Node B (eNB) comprising a cellular transceiver configured to communicate with a first Relay Node (RN) and a second RN over a cellular frequency band of a Primary cell (PCell); a millimeter-wave (mmWave) transceiver to communicate with the second RN via a first backhaul link over a mmWave frequency band; and a controller to trigger the cellular transceiver to transmit to the first RN a Relay-Physical-Downlink-Control-Channel (R-PDCCH) message comprising cross-carrier scheduling information to schedule a downlink allocation over a second backhaul link between the first RN and the second RN.

Example 11 includes the subject matter of Example 10, and optionally, wherein the controller is to trigger the cellular transceiver to transmit to the second RN a first R-PDCCH message during a first Transmit Time Interval (TTI), the first R-PDCCH message to schedule uplink transmission of a data packet from the second RN to the first RN over the second backhaul link during a second TTI subsequent to the first TTI, the controller is to trigger the cellular transceiver to transmit to the first RN a second R-PDCCH message during the second TTI, the second R-PDCCH message to schedule downlink reception of the data packet from the second RN at the first RN.

Example 12 includes the subject matter of Example 10 or 11, and optionally, wherein the controller is to trigger the mmWave transceiver to send to the second RN via the first backhaul link a data packet to be relayed to the first RN via the second backhaul link.

Example 13 includes the subject matter of Example 12, and optionally, wherein the controller is to trigger the cellular transceiver to transmit the R-PDCCH to schedule a Transmit Time Interval (TTI), in which the data packet is to be sent by the second RN.

Example 14 includes the subject matter of any one of Examples 10-13, and optionally, wherein the first RN is configured to operate as a Donor eNB (DeNB) of the PCell.

Example 15 includes the subject matter of any one of Examples 10-14, and optionally, comprising one or more antennas, a memory and a processor.

Example 16 includes an evolved Node B (eNB) comprising a cellular transceiver configured to communicate with a first Relay Node (RN) and a second RN over a cellular frequency band of a Primary cell (PCell); a millimeter-wave (mmWave) transceiver to communicate with the second RN via a backhaul link over a mmWave frequency band; and a controller to configure a primary Relay-Physical-Downlink-Control-Channel (R-PDCCH) set to communicate primary R-PDCCH messages between the DeNB and the first RN, and a secondary R-PDCCH set to communicate secondary R-PDCCH messages between the second RN and the first RN, the controller to trigger the cellular transceiver to transmit to the first RN a message comprising configuration information of the primary R-PDCCH set and the secondary R-PDCCH set.

Example 17 includes the subject matter of Example 16, and optionally, wherein the message comprises a Radio Resource Control (RRC) message.

Example 18 includes the subject matter of Example 16 or 17, and optionally, wherein the controller is to trigger the mmWave transceiver to send to the second RN via the backhaul link a data packet to be relayed to the first RN.

Example 19 includes the subject matter of any one of Examples 16-18, and optionally, wherein the eNB is configured to operate as a Donor eNB (DeNB) of the PCell.

Example 20 includes the subject matter of any one of Examples 16-19, and optionally, comprising one or more antennas, a memory and a processor.

Example 21 includes an evolved Node B (eNB) comprising a cellular transceiver configured to communicate with a first Relay Node (RN) and a second RN over a cellular frequency band of a Primary cell (PCell); a millimeter-wave (mmWave) transceiver to communicate with the second RN via a backhaul link over a mmWave frequency band; and a controller to trigger the cellular transceiver to transmit to the second RN a handover request to handover the first RN to the second RN, to trigger the cellular transceiver to transmit to the first RN an attach request to attach to the second RN, and to trigger the mmWave transceiver to transmit to the second RN via the backhaul link a data packet to be relayed to the first RN.

Example 22 includes the subject matter of Example 21, and optionally, wherein the handover request message and the attach request message comprise Radio Resource Control (RRC) messages.

Example 23 includes the subject matter of any one of Example 21 or 22, and optionally, wherein the eNB is configured to operate as a Donor eNB (DeNB) of the PCell.

Example 24 includes the subject matter of any one of Examples 21-23, and optionally, comprising one or more antennas, a memory and a processor.

Example 25 includes an apparatus comprising circuitry configured to cause a first Relay Node (RN) to communicate with a Donor evolved Node B (DeNB) over a cellular frequency band of a Primary cell (PCell); communicate with a second RN via a backhaul link over a millimeter wave (mmWave) frequency band of a Secondary cell (SCell) within the PCell; process a Relay-Physical-Downlink-Control-Channel (R-PDCCH) message received over the cellular frequency band of the PCell, the R-PDCCH message comprising cross-carrier scheduling information to schedule a downlink allocation over the backhaul link; and receive a downlink data packet from the second RN during the downlink allocation.

Example 26 includes the subject matter of Example 25, and optionally, wherein the apparatus is configured to cause the first RN to receive the R-PDCCH message from the DeNB Example 27 includes the subject matter of Example 26, and optionally, wherein the downlink data packet comprises a data packet from the DeNB relayed via the second RN.

Example 28 includes the subject matter of Example 26 or 27, and optionally wherein the apparatus is configured to cause the first RN to receive the downlink data packet via the backhaul link during a Transmit Time Interval (TTI) associated with the R-PDCCH message.

Example 29 includes the subject matter of Example 25, and optionally, wherein the apparatus is configured to cause the first RN to receive the R-PDCCH message from the second RN.

Example 30 includes the subject matter of Example 29, and optionally, wherein the R-PDCCH message comprises a secondary R-PDCCH message, the apparatus configured to cause the first RN to receive from the DeNB a primary R-PDCCH message to schedule an allocation over the cellular frequency band.

Example 31 includes the subject matter of Example 30, and optionally, wherein the apparatus is configured to cause the first RN to configure, according to a Radio Resource Control (RRC) message from the DeNB, a setting of a primary R-PDCCH set with the DeNB and a secondary R-PDCCH set with the second RN.

Example 32 includes the subject matter of Example 29, and optionally, wherein the apparatus is configured to cause the first RN to handover the first RN from the DeNB to the second RN based on a handover request from the DeNB, and to receive the R-PDCCH message from the second RN after the handover to the second RN.

Example 33 includes the subject matter of any one of Examples 25-32, and optionally, comprising a cellular transceiver, and a mmWave transceiver.

Example 34 includes an apparatus comprising circuitry configured to cause an evolved Node B (eNB) to communicate with a first Relay Node (RN) and a second RN over a cellular frequency band of a Primary cell (PCell); communicate with the second RN via a first backhaul link over a millimeter wave (mmWave) frequency band; and transmit to the first RN a Relay-Physical-Downlink-Control-Channel (R-PDCCH) message comprising cross-carrier scheduling information to schedule a downlink allocation over a second backhaul link between the first RN and the second RN.

Example 35 includes the subject matter of Example 34, and optionally, wherein the apparatus is configured to cause the eNB to transmit to the second RN a first R-PDCCH message during a first Transmit Time Interval (TTI), the first R-PDCCH message to schedule uplink transmission of a data packet from the second RN to the first RN over the second backhaul link during a second TTI subsequent to the first TTI, and to transmit to the first RN a second R-PDCCH message during the second TTI, the second R-PDCCH message to schedule downlink reception of the data packet from the second RN at the first RN.

Example 36 includes the subject matter of Example 34 or 35, and optionally, wherein the apparatus is configured to cause the eNB to send to the second RN via the first backhaul link a data packet to be relayed to the first RN via the second backhaul link.

Example 37 includes the subject matter of Example 36, and optionally, wherein the apparatus is configured to cause the eNB to transmit the R-PDCCH to schedule a Transmit Time Interval (TTI), in which the data packet is to be sent by the second RN.

Example 38 includes the subject matter of any one of Examples 34-37, and optionally, wherein the apparatus is configured to cause the eNB operate as a Donor eNB (DeNB) of the PCell.

Example 39 includes the subject matter of any one of Examples 34-38, and optionally, comprising a cellular transceiver, and a mmWave transceiver.

Example 40 includes an apparatus comprising circuitry configured to cause an evolved Node B (eNB) to communicate with a first Relay Node (RN) and a second RN over a cellular frequency band of a Primary cell (PCell); communicate with the second RN via a backhaul link over a millimeter wave (mmWave) frequency band; configure a primary Relay-Physical-Downlink-Control-Channel (R-PDCCH) set to communicate primary R-PDCCH messages between the DeNB and the first RN, and a secondary R-PDCCH set to communicate secondary R-PDCCH messages between the second RN and the first RN; and transmit to the first RN a message comprising configuration information of the primary R-PDCCH set and the secondary R-PDCCH set.

Example 41 includes the subject matter of Example 40, and optionally, wherein the message comprises a Radio Resource Control (RRC) message.

Example 42 includes the subject matter of Example 40 or 41, and optionally, wherein the apparatus is configured to cause the eNB to send to the second RN via the backhaul link a data packet to be relayed to the first RN.

Example 43 includes the subject matter of any one of Examples 40-42, and optionally, wherein the apparatus is configured to cause the eNB to operate as a Donor eNB (DeNB) of the PCell.

Example 44 includes the subject matter of any one of Examples 40-43, and optionally, comprising a cellular transceiver, and a mmWave transceiver.

Example 45 includes an apparatus comprising circuitry configured to cause an evolved Node B (eNB) to communicate with a first Relay Node (RN) and a second RN over a cellular frequency band of a Primary cell (PCell); communicate with the second RN via a backhaul link over a millimeter-wave (mmWave) frequency band; transmit to the second RN a handover request to handover the first RN to the second RN; transmit to the first RN an attach request to attach to the second RN; and transmit to the second RN via the backhaul link a data packet to be relayed to the first RN.

Example 46 includes the subject matter of Example 45, and optionally, wherein the handover request message and the attach request message comprise Radio Resource Control (RRC) messages.

Example 47 includes the subject matter of any one of Example 45 or 46, and optionally, wherein the apparatus is configured to cause the eNB to operate as a Donor eNB (DeNB) of the PCell.

Example 48 includes the subject matter of any one of Examples 45-47, and optionally, comprising a cellular transceiver, and a mmWave transceiver.

Example 49 includes a method to be performed at a first Relay Node (RN), the method comprising communicating with a Donor evolved Node B (DeNB) over a cellular frequency band of a Primary cell (PCell); communicating with a second RN via a backhaul link over a millimeter wave (mmWave) frequency band of a Secondary cell (SCell) within the PCell; processing a Relay-Physical-Downlink-Control-Channel (R-PDCCH) message received over the cellular frequency band of the PCell, the R-PDCCH message comprising cross-carrier scheduling information to schedule a downlink allocation over the backhaul link; and receiving a downlink data packet from the second RN during the downlink allocation.

Example 50 includes the subject matter of Example 49, and optionally, comprising receiving the R-PDCCH message from the DeNB Example 51 includes the subject matter of Example 50, and optionally, wherein the downlink data packet comprises a data packet from the DeNB relayed via the second RN.

Example 52 includes the subject matter of Example 49 or 50, and optionally, comprising receiving the downlink data packet via the backhaul link during a Transmit Time Interval (TTI) associated with the R-PDCCH message.

Example 53 includes the subject matter of Example 49, and optionally, comprising receiving the R-PDCCH message from the second RN.

Example 54 includes the subject matter of Example 53, and optionally, wherein the R-PDCCH message comprises a secondary R-PDCCH message, the method comprising receiving from the DeNB a primary R-PDCCH message to schedule an allocation over the cellular frequency band.

Example 55 includes the subject matter of Example 54, and optionally, comprising configuring, according to a Radio Resource Control (RRC) message from the DeNB, a setting of a primary R-PDCCH set with the DeNB and a secondary R-PDCCH set with the second RN.

Example 56 includes the subject matter of Example 53, and optionally, comprising handing over the first RN from the DeNB to the second RN based on a handover request from the DeNB, and receiving the R-PDCCH message from the second RN after the handover to the second RN.

Example 57 includes a method to be performed at an evolved Node B (eNB), the method comprising communicating with a first Relay Node (RN) and a second RN over a cellular frequency band of a Primary cell (PCell); communicating with the second RN via a first backhaul link over a millimeter wave (mmWave) frequency band; and transmitting to the first RN a Relay-Physical-Downlink-Control-Channel (R-PDCCH) message comprising cross-carrier scheduling information to schedule a downlink allocation over a second backhaul link between the first RN and the second RN.

Example 58 includes the subject matter of Example 57, and optionally, comprising transmitting to the second RN a first R-PDCCH message during a first Transmit Time Interval (TTI), the first R-PDCCH message to schedule uplink transmission of a data packet from the second RN to the first RN over the second backhaul link during a second TTI subsequent to the first TTI, and transmitting to the first RN a second R-PDCCH message during the second TTI, the second R-PDCCH message to schedule downlink reception of the data packet from the second RN at the first RN.

Example 59 includes the subject matter of Example 57 or 58, and optionally, comprising sending to the second RN via the first backhaul link a data packet to be relayed to the first RN via the second backhaul link.

Example 60 includes the subject matter of Example 59, and optionally, comprising transmitting the R-PDCCH to schedule a Transmit Time Interval (TTI), in which the data packet is to be sent by the second RN.

Example 61 includes the subject matter of any one of Examples 57-60, and optionally, comprising operating the eNB as a Donor eNB (DeNB) of the PCell.

Example 62 includes a method to be performed at an evolved Node B (eNB), the method comprising communicating with a first Relay Node (RN) and a second RN over a cellular frequency band of a Primary cell (PCell); communicating with the second RN via a backhaul link over a millimeter wave (mmWave) frequency band; configuring a primary Relay-Physical-Downlink-Control-Channel (R-PDCCH) set to communicate primary R-PDCCH messages between the DeNB and the first RN, and a secondary R-PDCCH set to communicate secondary R-PDCCH messages between the second RN and the first RN; and transmitting to the first RN a message comprising configuration information of the primary R-PDCCH set and the secondary R-PDCCH set.

Example 63 includes the subject matter of Example 62, and optionally, wherein the message comprises a Radio Resource Control (RRC) message.

Example 64 includes the subject matter of Example 62 or 63, and optionally, comprising sending to the second RN via the backhaul link a data packet to be relayed to the first RN.

Example 65 includes the subject matter of any one of Examples 62-64, and optionally, comprising operating the eNB as a Donor eNB (DeNB) of the PCell.

Example 66 includes a method to be performed at an evolved Node B (eNB), the method comprising communicating with a first Relay Node (RN) and a second RN over a cellular frequency band of a Primary cell (PCell); communicating with the second RN via a backhaul link over a millimeter-wave (mmWave) frequency band; transmitting to the second RN a handover request to handover the first RN to the second RN; transmitting to the first RN an attach request to attach to the second RN; and transmitting to the second RN via the backhaul link a data packet to be relayed to the first RN.

Example 67 includes the subject matter of Example 66, and optionally, wherein the handover request message and the attach request message comprise Radio Resource Control (RRC) messages.

Example 68 includes the subject matter of any one of Example 66 or 67, and optionally, comprising operating the eNB as a Donor eNB (DeNB) of the PCell.

Example 69 includes a product comprising one or more tangible computer-readable non-transitory storage media comprising computer-executable instructions operable to, when executed by at least one computer processor, enable the at least one computer processor to implement one or more operations at a first Relay Node (RN), the operations comprising communicating with a Donor evolved Node B (DeNB) over a cellular frequency band of a Primary cell (PCell); communicating with a second RN via a backhaul link over a millimeter wave (mmWave) frequency band of a Secondary cell (SCell) within the PCell; processing a Relay-Physical-Downlink-Control-Channel (R-PDCCH) message received over the cellular frequency band of the PCell, the R-PDCCH message comprising cross-carrier scheduling information to schedule a downlink allocation over the backhaul link; and receiving a downlink data packet from the second RN during the downlink allocation.

Example 70 includes the subject matter of Example 69, and optionally, wherein the operations comprise receiving the R-PDCCH message from the DeNB Example 71 includes the subject matter of Example 70, and optionally, wherein the downlink data packet comprises a data packet from the DeNB relayed via the second RN.

Example 72 includes the subject matter of Example 69 or 70, and optionally, wherein the operations comprise receiving the downlink data packet via the backhaul link during a Transmit Time Interval (TTI) associated with the R-PDCCH message.

Example 73 includes the subject matter of Example 69, and optionally, wherein the operations comprise receiving the R-PDCCH message from the second RN.

Example 74 includes the subject matter of Example 73, and optionally, wherein the R-PDCCH message comprises a secondary R-PDCCH message, the operations comprising receiving from the DeNB a primary R-PDCCH message to schedule an allocation over the cellular frequency band.

Example 75 includes the subject matter of Example 74, and optionally, wherein the operations comprise configuring, according to a Radio Resource Control (RRC) message from the DeNB, a setting of a primary R-PDCCH set with the DeNB and a secondary R-PDCCH set with the second RN.

Example 76 includes the subject matter of Example 73, and optionally, wherein the operations comprise handing over the first RN from the DeNB to the second RN based on a handover request from the DeNB, and receiving the R-PDCCH message from the second RN after the handover to the second RN.

Example 77 includes a product comprising one or more tangible computer-readable non-transitory storage media comprising computer-executable instructions operable to, when executed by at least one computer processor, enable the at least one computer processor to implement one or more operations at an evolved Node B (eNB), the operations comprising communicating with a first Relay Node (RN) and a second RN over a cellular frequency band of a Primary cell (PCell); communicating with the second RN via a first backhaul link over a millimeter wave (mmWave) frequency band; and transmitting to the first RN a Relay-Physical-Downlink-Control-Channel (R-PDCCH) message comprising cross-carrier scheduling information to schedule a downlink allocation over a second backhaul link between the first RN and the second RN.

Example 78 includes the subject matter of Example 77, and optionally, wherein the operations comprise transmitting to the second RN a first R-PDCCH message during a first Transmit Time Interval (TTI), the first R-PDCCH message to schedule uplink transmission of a data packet from the second RN to the first RN over the second backhaul link during a second TTI subsequent to the first TTI, and transmitting to the first RN a second R-PDCCH message during the second TTI, the second R-PDCCH message to schedule downlink reception of the data packet from the second RN at the first RN.

Example 79 includes the subject matter of Example 77 or 78, and optionally, wherein the operations comprise sending to the second RN via the first backhaul link a data packet to be relayed to the first RN via the second backhaul link.

Example 80 includes the subject matter of Example 79, and optionally, wherein the operations comprise transmitting the R-PDCCH to schedule a Transmit Time Interval (TTI), in which the data packet is to be sent by the second RN.

Example 81 includes the subject matter of any one of Examples 77-80, and optionally, wherein the operations comprise operating the eNB as a Donor eNB (DeNB) of the PCell.

Example 82 includes a product comprising one or more tangible computer-readable non-transitory storage media comprising computer-executable instructions operable to, when executed by at least one computer processor, enable the at least one computer processor to implement one or more operations at an evolved Node B (eNB), the operations comprising communicating with a first Relay Node (RN) and a second RN over a cellular frequency band of a Primary cell (PCell); communicating with the second RN via a backhaul link over a millimeter wave (mmWave) frequency band; configuring a primary Relay-Physical-Downlink-Control-Channel (R-PDCCH) set to communicate primary R-PDCCH messages between the DeNB and the first RN, and a secondary R-PDCCH set to communicate secondary R-PDCCH messages between the second RN and the first RN; and transmitting to the first RN a message comprising configuration information of the primary R-PDCCH set and the secondary R-PDCCH set.

Example 83 includes the subject matter of Example 82, and optionally, wherein the message comprises a Radio Resource Control (RRC) message.

Example 84 includes the subject matter of Example 82 or 83, and optionally, wherein the operations comprise sending to the second RN via the backhaul link a data packet to be relayed to the first RN.

Example 85 includes the subject matter of any one of Examples 82-84, and optionally, wherein the operations comprise operating the eNB as a Donor eNB (DeNB) of the PCell.

Example 86 includes a product comprising one or more tangible computer-readable non-transitory storage media comprising computer-executable instructions operable to, when executed by at least one computer processor, enable the at least one computer processor to implement one or more operations at an evolved Node B (eNB), the operations comprising communicating with a first Relay Node (RN) and a second RN over a cellular frequency band of a Primary cell (PCell); communicating with the second RN via a backhaul link over a millimeter-wave (mmWave) frequency band; transmitting to the second RN a handover request to handover the first RN to the second RN; transmitting to the first RN an attach request to attach to the second RN; and transmitting to the second RN via the backhaul link a data packet to be relayed to the first RN.

Example 87 includes the subject matter of Example 86, and optionally, wherein the handover request message and the attach request message comprise Radio Resource Control (RRC) messages.

Example 88 includes the subject matter of any one of Example 86 or 87, and optionally, wherein the operations comprise operating the eNB as a Donor eNB (DeNB) of the PCell.

Example 89 includes an apparatus to control communication by a first Relay Node (RN), the apparatus comprising means for communicating with a Donor evolved Node B (DeNB) over a cellular frequency band of a Primary cell (PCell); means for communicating with a second RN via a backhaul link over a millimeter wave (mmWave) frequency band of a Secondary cell (SCell) within the PCell; means for processing a Relay-Physical-Downlink-Control-Channel (R-PDCCH) message received over the cellular frequency band of the PCell, the R-PDCCH message comprising cross-carrier scheduling information to schedule a downlink allocation over the backhaul link; and means for receiving a downlink data packet from the second RN during the downlink allocation.

Example 90 includes the subject matter of Example 89, and optionally, comprising means for receiving the R-PDCCH message from the DeNB Example 91 includes the subject matter of Example 90, and optionally, wherein the downlink data packet comprises a data packet from the DeNB relayed via the second RN.

Example 92 includes the subject matter of Example 89 or 90, and optionally, comprising means for receiving the downlink data packet via the backhaul link during a Transmit Time Interval (TTI) associated with the R-PDCCH message.

Example 93 includes the subject matter of Example 89, and optionally, comprising means for receiving the R-PDCCH message from the second RN.

Example 94 includes the subject matter of Example 93, and optionally, wherein the R-PDCCH message comprises a secondary R-PDCCH message, the apparatus comprising means for receiving from the DeNB a primary R-PDCCH message to schedule an allocation over the cellular frequency band.

Example 95 includes the subject matter of Example 94, and optionally, comprising means for configuring, according to a Radio Resource Control (RRC) message from the DeNB, a setting of a primary R-PDCCH set with the DeNB and a secondary R-PDCCH set with the second RN.

Example 96 includes the subject matter of Example 93, and optionally, comprising means for handing over the first RN from the DeNB to the second RN based on a handover request from the DeNB, and receiving the R-PDCCH message from the second RN after the handover to the second RN.

Example 97 includes an apparatus to control communication by an evolved Node B (eNB), the apparatus comprising means for communicating with a first Relay Node (RN) and a second RN over a cellular frequency band of a Primary cell (PCell); means for communicating with the second RN via a first backhaul link over a millimeter wave (mmWave) frequency band; and means for transmitting to the first RN a Relay-Physical-Downlink-Control-Channel (R-PDCCH) message comprising cross-carrier scheduling information to schedule a downlink allocation over a second backhaul link between the first RN and the second RN.

Example 98 includes the subject matter of Example 97, and optionally, comprising means for transmitting to the second RN a first R-PDCCH message during a first Transmit Time Interval (TTI), the first R-PDCCH message to schedule uplink transmission of a data packet from the second RN to the first RN over the second backhaul link during a second TTI subsequent to the first TTI, and transmitting to the first RN a second R-PDCCH message during the second TTI, the second R-PDCCH message to schedule downlink reception of the data packet from the second RN at the first RN.

Example 99 includes the subject matter of Example 97 or 98, and optionally, comprising means for sending to the second RN via the first backhaul link a data packet to be relayed to the first RN via the second backhaul link.

Example 100 includes the subject matter of Example 99, and optionally, comprising means for transmitting the R-PDCCH to schedule a Transmit Time Interval (TTI), in which the data packet is to be sent by the second RN.

Example 101 includes the subject matter of any one of Examples 97-100, and optionally, comprising means for operating the eNB as a Donor eNB (DeNB) of the PCell.

Example 102 includes an apparatus to control communication by an evolved Node B (eNB), the apparatus comprising means for communicating with a first Relay Node (RN) and a second RN over a cellular frequency band of a Primary cell (PCell); means for communicating with the second RN via a backhaul link over a millimeter wave (mmWave) frequency band; means for configuring a primary Relay-Physical-Downlink-Control-Channel (R-PDCCH) set to communicate primary R-PDCCH messages between the DeNB and the first RN, and a secondary R-PDCCH set to communicate secondary R-PDCCH messages between the second RN and the first RN; and means for transmitting to the first RN a message comprising configuration information of the primary R-PDCCH set and the secondary R-PDCCH set.

Example 103 includes the subject matter of Example 102, and optionally, wherein the message comprises a Radio Resource Control (RRC) message.

Example 104 includes the subject matter of Example 102 or 103, and optionally, comprising means for sending to the second RN via the backhaul link a data packet to be relayed to the first RN.

Example 105 includes the subject matter of any one of Examples 102-104, and optionally, comprising means for operating the eNB as a Donor eNB (DeNB) of the PCell.

Example 106 includes an apparatus to control communication by an evolved Node B (eNB), the apparatus comprising means for communicating with a first Relay Node (RN) and a second RN over a cellular frequency band of a Primary cell (PCell); means for communicating with the second RN via a backhaul link over a millimeter-wave (mmWave) frequency band; means for transmitting to the second RN a handover request to handover the first RN to the second RN; means for transmitting to the first RN an attach request to attach to the second RN; and means for transmitting to the second RN via the backhaul link a data packet to be relayed to the first RN.

Example 107 includes the subject matter of Example 106, and optionally, wherein the handover request message and the attach request message comprise Radio Resource Control (RRC) messages.

Example 108 includes the subject matter of any one of Example 106 or 107, and optionally, comprising means for operating the eNB as a Donor eNB (DeNB) of the PCell.

Functions, operations, components and/or features described herein with reference to one or more embodiments, may be combined with, or may be utilized in combination with, one or more other functions, operations, components and/or features described herein with reference to one or more other embodiments, or vice versa.

While certain features have been illustrated and described herein, many modifications, substitutions, changes, and equivalents may occur to those skilled in the art. It is, therefore, to be understood that the appended claims are intended to cover all such modifications and changes as fall within the true spirit of the disclosure.

What is claimed is:

1. A first Relay Node (RN) comprising:
    a cellular transceiver configured to communicate with a Donor evolved Node B (DeNB) over a cellular frequency band of a Primary cell (PCell), the cellular frequency band comprising a non-millimeter wave (non-mmWave) frequency band below 6 Gigahertz (GHz);
    a millimeter-wave (mmWave) transceiver to communicate with a second RN via a backhaul link over an mmWave frequency band of a Secondary cell (SCell) within the PCell; and
    a controller to configure, according to a Radio Resource Control (RRC) message from the DeNB, a setting of a primary Relay-Physical-Downlink-Control-Channel (R-PDCCH) set with the DeNB and a secondary R-PDCCH set with the second RN, wherein the controller is configured to process a primary R-PDCCH message from the DeNB and a secondary R-PDCCH message received by the cellular transceiver over the cellular frequency band of the PCell, the primary R-PDCCH message from the DeNB to schedule an allocation over the cellular frequency band, the secondary R-PDCCH message to be received by the first RN from said second RN over the cellular frequency band, the secondary R-PDCCH message comprising cross-carrier scheduling information to schedule a downlink allocation over the backhaul link, said controller to trigger the mmWave transceiver to receive a downlink data packet from said second RN during the downlink allocation.

2. The first RN of claim 1, wherein said controller is configured to handover the first RN to the second RN based on a handover request from the DeNB.

3. The first RN of claim 1, wherein said controller is to handover the first RN from the DeNB to the second RN based on a handover request from the DeNB, and to receive the secondary R-PDCCH message from said second RN after the handover to the second RN.

4. The first RN of claim 1 comprising one or more antennas, a memory and a processor.

5. An evolved Node B (eNB) comprising:
    a cellular transceiver configured to communicate with a first Relay Node (RN) and a second RN over a cellular frequency band of a Primary cell (PCell);
    a millimeter-wave (mmWave) transceiver to communicate with the second RN via a first backhaul link over an mmWave frequency band; and
    a controller to trigger the cellular transceiver to transmit to the second RN a first Relay-Physical-Downlink-Control-Channel (R-PDCCH) message during a first Transmit Time Interval (TTI), the first R-PDCCH message to schedule uplink transmission of a data packet from the second RN to the first RN over a second backhaul link between the first RN and the second RN during a second TTI subsequent to the first TTI, said controller is to trigger the cellular transceiver to transmit to the first RN a second R-PDCCH message during the second TTI, the second R-PDCCH message comprising cross-carrier scheduling information to schedule a downlink allocation over the second backhaul link, the second R-PDCCH message to schedule downlink reception of the data packet from the second RN at the first RN.

6. The eNB of claim 5, wherein the controller is to trigger the mmWave transceiver to send to the second RN via the first backhaul link the data packet to be relayed to the first RN via the second backhaul link.

7. The eNB of claim 5 configured to operate as a Donor eNB (DeNB) of the PCell.

8. The eNB of claim 5 comprising one or more antennas, a memory and a processor.

9. A product comprising one or more tangible computer-readable non-transitory storage media comprising computer-executable instructions operable to, when executed by at least one processor, enable the at least one processor to cause a first Relay Node (RN) to:
    configure, according to a Radio Resource Control (RRC) message from a Donor evolved Node B (DeNB), a setting of a primary Relay-Physical-Downlink-Control-Channel (R-PDCCH) set with the DeNB and a secondary R-PDCCH set with a second RN, the RRC message to be received from the DeNB over a cellular frequency band of a Primary cell (PCell), the cellular frequency band comprising a non-millimeter wave (non-mmWave) frequency band below 6 Gigahertz (GHz);

process a primary R-PDCCH message from the DeNB to schedule an allocation over the cellular frequency band;

process a secondary R-PDCCH message received from the second RN over the cellular frequency band, the secondary R-PDCCH message comprising cross-carrier scheduling information to schedule a downlink allocation over a backhaul link between the first RN and the second RN, the backhaul link over a millimeter-wave (mmWave) frequency band of a Secondary cell (SCell) within the PCell; and receive a downlink data packet from said second RN during the downlink allocation.

10. The product of claim 9, wherein the instructions, when executed, cause the first RN to handover the first RN to the second RN based on a handover request from the DeNB.

11. The product of claim 9, wherein the instructions, when executed, cause the first RN to handover the first RN from the DeNB to the second RN based on a handover request from the DeNB, and to receive the secondary R-PDCCH message from said second RN after the handover to the second RN.

12. A product comprising one or more tangible computer-readable non-transitory storage media comprising computer-executable instructions operable to, when executed by at least one processor, enable the at least one processor to cause an evolved Node B (eNB) to:

communicate with a first Relay Node (RN) and a second RN over a cellular frequency band of a Primary cell (PCell);

communicate with the second RN via a first backhaul link over a millimeter-wave (mmWave) frequency band;

transmit to the second RN a first Relay-Physical-Downlink-Control-Channel (R-PDCCH) message during a first Transmit Time Interval (TTI), the first R-PDCCH message to schedule uplink transmission of a data packet from the second RN to the first RN over a second backhaul link between the first RN and the second RN during a second TTI subsequent to the first TTI; and transmit to the first RN a second R-PDCCH message during the second TTI, the second R-PDCCH message comprising cross-carrier scheduling information to schedule a downlink allocation over the second backhaul link, the second R-PDCCH message to schedule downlink reception of the data packet from the second RN at the first RN.

13. The product of claim 12, wherein the instructions, when executed, cause the eNB to send to the second RN via the first backhaul the data packet to be relayed to the first RN via the second backhaul link.

14. The product of claim 12, wherein the instructions, when executed, cause the eNB to operate as a Donor eNB (DeNB) of the PCell.

* * * * *

UNITED STATES PATENT AND TRADEMARK OFFICE
CERTIFICATE OF CORRECTION

PATENT NO. : 10,362,525 B2
APPLICATION NO. : 15/503477
DATED : July 23, 2019
INVENTOR(S) : Honglei Miao et al.

Page 1 of 1

It is certified that error appears in the above-identified patent and that said Letters Patent is hereby corrected as shown below:

In the Claims

In Column 34, Line 3, in Claim 12, delete "(PCell;" and insert --(PCell);--, therefor.

Signed and Sealed this
Seventeenth Day of December, 2019

Andrei Iancu
*Director of the United States Patent and Trademark Office*